(12) United States Patent
August

(10) Patent No.: US 7,400,712 B2
(45) Date of Patent: Jul. 15, 2008

(54) NETWORK PROVIDED INFORMATION USING TEXT-TO-SPEECH AND SPEECH RECOGNITION AND TEXT OR SPEECH ACTIVATED NETWORK CONTROL SEQUENCES FOR COMPLIMENTARY FEATURE ACCESS

(75) Inventor: Katherine G. August, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1215 days.

(21) Appl. No.: 09/764,708

(22) Filed: Jan. 18, 2001

(65) Prior Publication Data

US 2002/0094067 A1 Jul. 18, 2002

(51) Int. Cl.
H04M 1/64 (2006.01)
(52) U.S. Cl. ................................ 379/88.01; 379/88.17
(58) Field of Classification Search ... 379/88.01–88.04, 379/88.05, 88.17, 88.22; 455/563
See application file for complete search history.

(56) References Cited

U.S. PATENT DOCUMENTS

| 4,022,974 | A |   | 5/1977  | Kohut et al. |           |
|-----------|---|---|---------|--------------|-----------|
| 4,582,956 | A |   | 4/1986  | Doughty      |           |
| 5,566,229 | A | * | 10/1996 | Hou et al.   | 379/88.02 |
| 5,594,784 | A | * | 1/1997  | Velius       | 379/88.02 |
| 5,606,644 | A |   | 2/1997  | Chou et al.  |           |
| 5,634,086 | A |   | 5/1997  | Rtischev et al. |         |
| 5,649,057 | A |   | 7/1997  | Lee et al.   |           |
| 5,675,704 | A |   | 10/1997 | Juang et al. |           |
| 5,675,706 | A |   | 10/1997 | Lee et al.   |           |
| 5,710,864 | A |   | 1/1998  | Juang et al. |           |
| 5,719,921 | A | * | 2/1998  | Vysotsky et al. | 379/88.01 |
| 5,727,124 | A |   | 3/1998  | Lee et al.   |           |
| 5,737,489 | A |   | 4/1998  | Chou et al.  |           |
| 5,751,907 | A |   | 5/1998  | Moebius et al. |         |
| 5,790,978 | A |   | 8/1998  | Olive et al. |           |

(Continued)

FOREIGN PATENT DOCUMENTS

EP 0 892 387 A1 1/1999

(Continued)

*Primary Examiner*—Fan Tsang
*Assistant Examiner*—Joseph T Phan

(57) ABSTRACT

A real-time networked telephony or computer system has a feature complex and/or applications that offer a class of features to a subscriber, including call information, and permits the subscriber to manage incoming and existing calls through available features accessed using spoken utterances. A speech processing unit coupled to the system interprets a subscriber's spoken utterances without requiring the subscriber to train the system to recognize his or her voice. The interpretation of spoken utterances is enabled by a system state database that is maintained at the speech processing unit and comprises a database of the possible system slates, including possible call flows for a call, and a database associated with the system state database comprising context-specific grammar that a subscriber may recite at respective points in the call flow. The speech processing unit may also convert message signals from the network to speech which is read to the subscriber using a text to speech translator. The network can identify the voice or subscriber voice, or language used and will thereafter recognize all further commands using specific grammar for that language as well as perform text-to-speech conversion using the identified language. Use of the features can be applied to update of grammars, profiles and templates, etc. by transmitting results of transactions.

32 Claims, 21 Drawing Sheets

U.S. PATENT DOCUMENTS

| | | | |
|---|---|---|---|
| 5,797,123 A | | 8/1998 | Chou et al. |
| 5,805,772 A | | 9/1998 | Chou et al. |
| 5,832,063 A | * | 11/1998 | Vysotsky et al. ......... 379/88.03 |
| 6,003,005 A | | 12/1999 | Hirschberg |
| 6,058,166 A | * | 5/2000 | Osder et al. .............. 379/88.22 |
| 6,144,723 A | * | 11/2000 | Truchon et al. .......... 379/88.01 |
| 6,335,928 B1 | * | 1/2002 | Herrmann et al. ........... 370/352 |
| 6,449,496 B1 | * | 9/2002 | Beith et al. ................. 455/563 |
| 6,466,654 B1 | * | 10/2002 | Cooper et al. ............ 379/88.01 |
| 6,519,479 B1 | * | 2/2003 | Garudadri et al. ........... 455/563 |
| 6,665,377 B1 | * | 12/2003 | McKinley et al. ........ 379/88.01 |
| 6,697,460 B2 | * | 2/2004 | Knott et al. ............... 379/88.22 |
| 6,826,264 B2 | * | 11/2004 | Valco et al. ................. 379/67.1 |
| 6,868,142 B2 | * | 3/2005 | Gupta et al. ............. 379/88.04 |
| 7,212,970 B2 | * | 5/2007 | Rodrigo ...................... 704/275 |

FOREIGN PATENT DOCUMENTS

| | | |
|---|---|---|
| EP | 0 892 388 A1 | 1/1999 |

* cited by examiner

VIV = VERBAL INFORMATION VERIFICATION
TTS = TEXT TO SPEECH

SYSTEM STATE DATABASE

FIG. 5B

DATABASE LOOKUP FOR TARGET DEVICE/S — 240

| PROFILES | FORMAT FOR FEATURES TRANSLATOR | SPEAKER | MICROPHONE | DISPLAY | SIZE | COLOR | KEYPAD | SIZE | CONFIG. | ETC. |
|---|---|---|---|---|---|---|---|---|---|---|
| EARBUD 1 | FORM 1 | ✓ | ✓ | . | . | . | . | . | . | . |
| ... | ... | ... | ... | ... | ... | ... | ... | ... | ... | ... |
| EARBUD N | FORM 1 | ✓ | ✓ | . | . | . | . | . | . | . |
| HANDSET 1 | FORM 10 | ✓ | ✓ | ✓ | 16 X 6 | . | TYPE 1 | . | . | . |
| ... | ... | ... | ... | ... | ... | ... | ... | ... | ... | ... |
| HANDSET N | FORM 12 | ✓ | ✓ | ✓ | 16 X 2 | . | TYPE N | . | . | . |
| APPLIANCE 1 | FORM 100 | ✓ | ✓ | ✓ | 40 X 60 | . | TYPE 1 | . | . | . |
| ... | ... | ... | ... | ... | ... | ... | ... | ... | ... | ... |
| APPLIANCE N | FORM 110 | ✓ | . | . | . | . | TYPE 1 | . | . | . |
| COMPUTER 1 | . | . | . | . | . | . | . | . | . | . |
| ... | ... | ... | ... | ... | ... | ... | ... | ... | ... | ... |
| COMPUTER N | . | . | . | . | . | . | . | . | . | . |

FIG. 8C
CALLER-RECORD DATABASE

666

| CALLER ID/ STATION ID | CUST ID | VOICE TEMPLATE | PASSWORD/KEY | PREF. LANGUAGE | SUBSCRIPTION INFORMATION |
|---|---|---|---|---|---|
| 732-555-1111 | 0231 | FILE 0231 | TURTLE | ENGLISH | REMOTE ACCESS |
| 732-555-2222 | 0232 | FILE 0232 | MARTIAN | ENGLISH | LOCAL/REGIONAL |
| 732-555-3333 | 0233 | FILE 0233 | ORANGE | ENGLISH | REMOTE ACCESS |
| ..... | ..... | ..... | ..... | ..... | ..... |

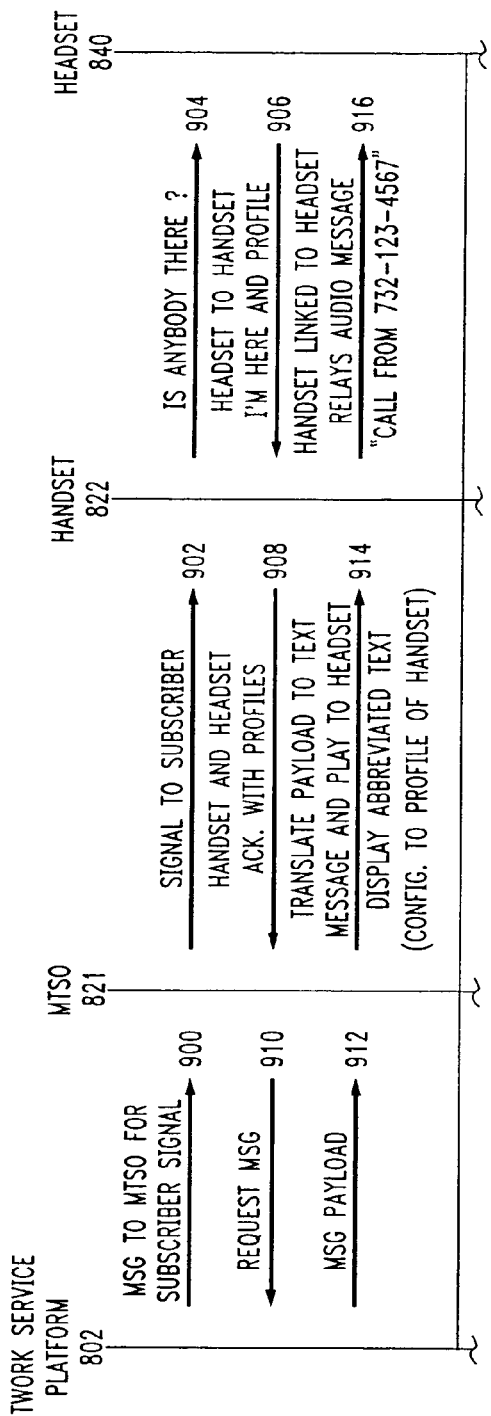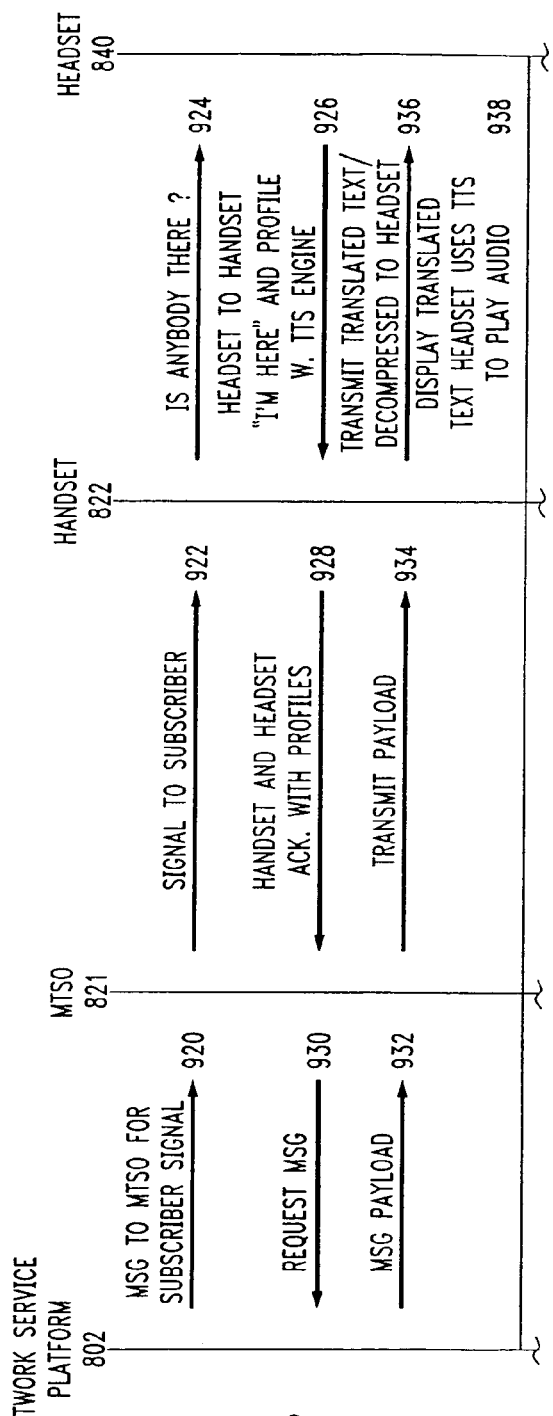
FIG. 11A
FIG. 11B

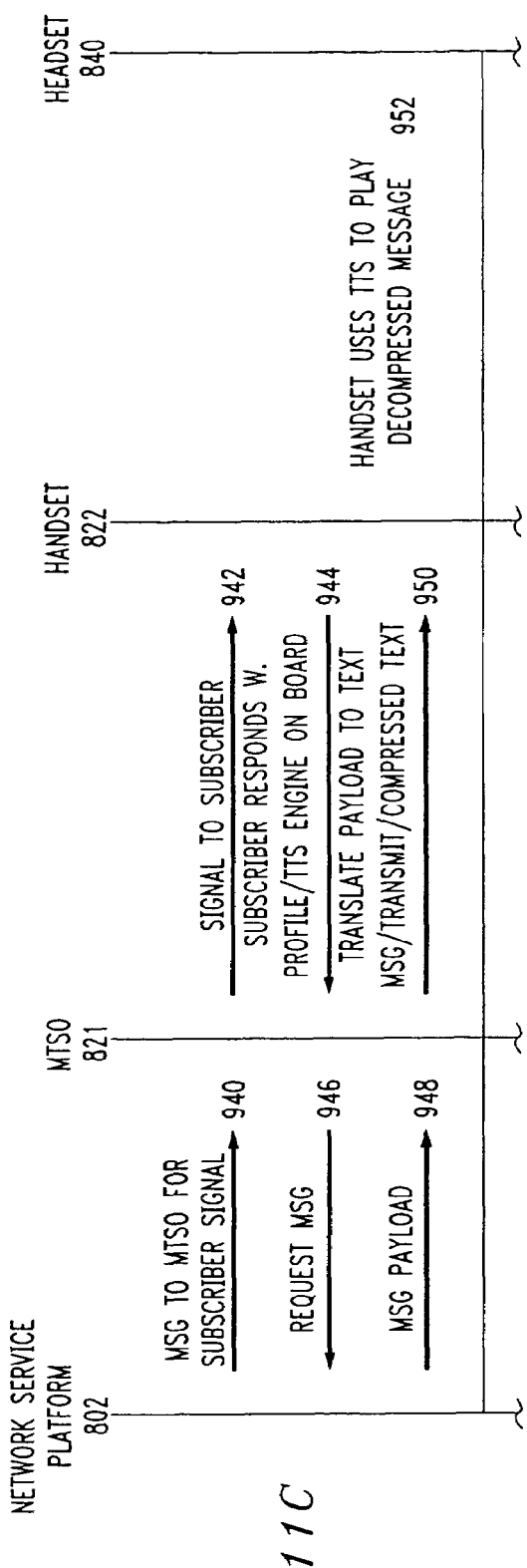
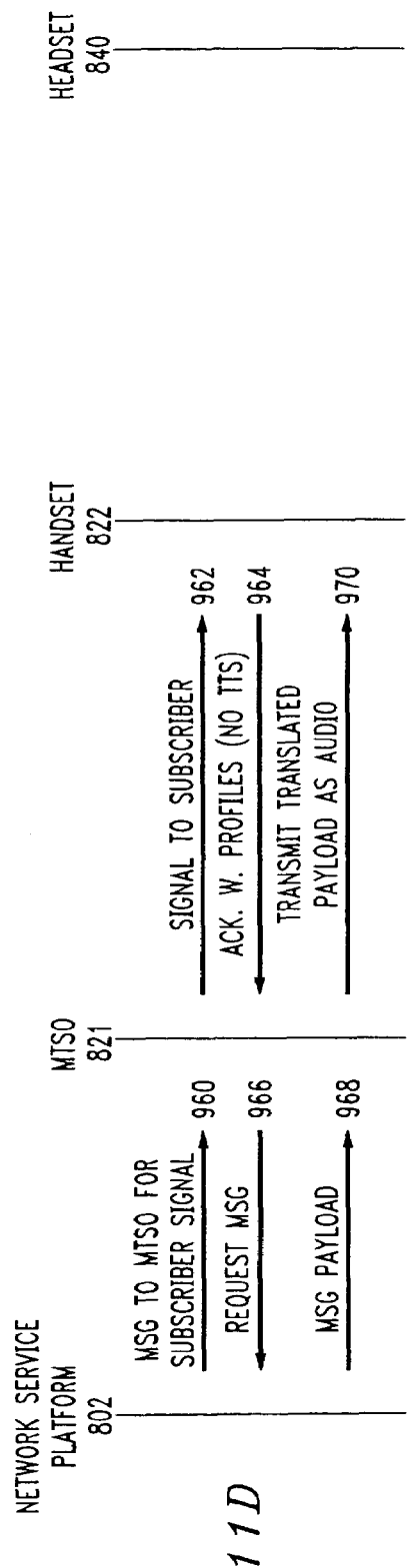
FIG. 11C
FIG. 11D

NETWORK PROVIDED INFORMATION USING TEXT-TO-SPEECH AND SPEECH RECOGNITION AND TEXT OR SPEECH ACTIVATED NETWORK CONTROL SEQUENCES FOR COMPLIMENTARY FEATURE ACCESS

BACKGROUND OF THE INVENTION

1. Field of the Invention

This invention relates to a method for network-based speech recognition of subscriber (or "user") voice-commands for invoking call information and management features and text-to-speech translation of call information and call management features.

2. Description of the Related Art

Real-time systems with telephony interfaces, including telephony and computer systems, offer a large variety of useful network-based features, such as Caller-ID, conferencing (call merge), call forwarding, call hold and messaging. However, these features must generally be accessed with some difficulty in a real-time interactive environment. Often, users cannot effectively access certain features, at least in part because such access requires knowledge of subject-specific details with which the user may be unfamiliar. Although the user can learn some subset of the features set and use them effectively with cues and practice, if the user does not need to use a particular system for some time, it is likely that his or her ability to use the system and understand the features will diminish. Users may also be unable to access certain features because the access device has a limited set of features, such as a small display on a cell phone handset.

While in operation, a system can be in one of many different "states" at which services or features are available. An example of such a system state is a state in which a Call Waiting call arrives and a caller-ID is to be displayed. The system transitions from a Call in Progress" state to a "Caller ID on Call Waiting" state at which point the subscriber has several options. Another example is when a subscriber calls someone and the called line rings busy. The system enters a state of "Busy" for at caller and an option is available to have the network feature continually re-try (redial) the called party until there is a "Ringing" system state. When the called party picks up, another system state is entered. If the called party does not answer after a predefined number of rings, then the system state changes to a "Ring-No-Answer" state and other features are available to the caller at this latter state, such as "Leave a Message", "Continue Trying the Number for 24 hours", etc.

A call flow is a pathway of steps that a call follows from the time that the call is initiated until termination of the call. Each step in the call flow may also be considered a different system state. The call flow may be controlled by the user to the extent that the user determines whether to initiate some calls, stay on the line, select features, answer a call, or subscribe to messaging services. Other types of system states include states wherein the caller communicates with the system or causes the system to communicate with another system, such as another network.

To remind users of features available at a particular point in a call flow or some other system state, specialized equipment is often used to display which features are available in the current state of a call or communication transaction. Computer and telephony systems, for example, require that users learn to interface with the systems using specialized devices, such as keypads, keyboards, mice, and trackballs, and special or reserved procedures which may appear in the form of an interaction on a computer screen or in a voice response system. Another limitation on feature accessibility is that the telephone keypad, keyboard, and mouse do not provide wide bandwidth for input to a system. In a real-time transaction environment, this constraint reduces the number of sophisticated features that may be made available in a telephony session or transaction dialog.

Some feature sets attempt to offer simplified interfaces by utilizing visual cues and mnemonic devices. An enhanced version of the Caller-ID feature, Caller-ID on Call Waiting, represents one attempt to provide a simplified interface with visual cues. Ordinary Caller-ID is provided using specialized equipment, such as an adjunct display device or a telephone with an integral display and special protocols. Currently available Caller-ID class 2 services, such as Caller-ID on Call Waiting, however, require more specialized equipment, such as an Analog Display Service Interface (ADSI) screen phone. There is an automated communication sequence between the service provider switch and the premise equipment that allows a user who receives Caller-ID information or originating system to utilize that information to make decisions as to how to handle ("manage") the incoming call based on the Caller-ID or originating station information. For example, using one feature call flow, when a person is already on the phone and another call comes in, the person already on the phone will now who is calling from the displayed Caller-ID information and can decide from a displayed menu whether to play a message and put the person on hold, conference the call with the current call, drop the current call and take the new call, send the call to voice mail, forward the call, or take other actions. But if one has only an ordinary non-ADSI phone, these actions must currently be entered using Star Features, such as *82, which are difficult to remember.

The specialized ADSI device displays in text form a full list of options which can be used to respond to the Caller-ID information. The subscriber can then select a desired option using the keypad which generates a DTMF (dual tone multi-frequency) signal understood by the service provider switch, or using soft keys on the ADSI screen phone which correspond to functional options displayed to the called party. Caller-ID information is displayed on a screen in either case.

The specialized ADSI equipment is expensive and its functionality is only available at the location of that phone. When a subscriber uses a different phone, he or she cannot access these features. Even in one household, only those extensions with the specialized phones will be able to use the enhanced feature set. Moreover, subscribers who are visually impaired may not be able to use the display devices at all.

There accordingly exists a need for network-based speech recognition. It would also be particularly helpful to combine the network-based speech recognition with a network-based text-to-speech translator of call state or progress information and available call management features. This would enable network service providers to offer a wide variety of features to mobile phone/web users by "translating" features available on a network to an audio format recognizable to the device upon which the audio is to be played, such as a sound or wave file, to which a user could respond with a voice command upon which speech recognition is performed. (The device-specific audio capabilities may be referred to as the device's audio form factor.)

SUMMARY OF THE INVENTION

The present invention therefore provides an automated speech recognition method and system such as Verbal Information Verification or the like that has the flexibility to utilize a more extensive grammar than in a system recognizing only globally-available commands without having to train the system to recognize the particular subscriber's pronunciations of words. In the inventive speech recognition method, a subscriber causes the performance of an action available on a communications network using a spoken utterance, which essentially operates as a voice command to activate a control sequence at the network. The type of action performed includes the accessing of a feature of a feature complex available on the network, such for example as call forwarding, hold, conferencing, voice-mail, call back, and caller-ID features, and a spoken menu of available features. In order to be recognized, the spoken utterance must be one that is permissible at a particular state, such as at a point in the call flow, in which the utterance is recited. After recognizing the spoken utterance, the utterance is converted to electronically-readable data having a format recognizable by the network or network application element. The control of features of the automated speech recognition method and system with spoken utterances may be supplemented with the inputting by a subscriber of key inputs that control features in combination with the spoken utterances.

To recognize the spoken utterance, a system state database is maintained either at a network level or at a point between the network and the subscriber's handset or headset or other type of subscriber device. The system state database has a plurality of nodes, each respective node representing a particular state of a plurality of possible system states. The possible system states may comprise the available steps in a call flow as well as other system states. Associated with each node in the system state database is a predetermined grammar that is available at the system state represented by that node. The grammar may be stored in a database separate from the system state database or in the system state database itself. The grammar available includes one or more "reserved words" that are descriptive of the action to be performed, and may further include synonyms of the one or more words, and globally-available words that are available at all of the plurality of nodes. The grammar for each node may be available for multiple languages. Because the system limits the number of words that may be accessed at any particular system state, the system need only compare the spoken utterance to a limited number of words available for that system state and hence has a simplified speech recognition task.

Additionally, the system may comprise a translation platform, such as a text-to-speech translator, of system features to audio form factors of communication devices that interact with the network to permit other network-generated signals, such as a signal in an ADSI or DTMF format, to be translated from an electronically-readable format to an audible message. The translator functionality can be used to provide a spoken menu of choices available to a subscriber at a given system state. The text-to-speech translator may provide audio using any means including a recorded announcement or synthesized announcement of menu choices that may be played to a subscriber. The text-to-speech functionality, or recording of announcement can also be used to inform the user about the "state" of a call, or what node of the system state database is activated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 5B depicts a look up table of device profiles for various possible target devices;

FIG. 8C depicts a sample database of caller information for use in the speech recognition method of FIG. 8C;

FIG. 11A is a call flow diagram of an algorithm for translating a network-generated signal from text to speech to be heard as an audible message on a subscriber's mobile phone headset where a text-to-speech engine is included at the mobile telephone switching office;

FIG. 11B is a call flow diagram of an algorithm for translating a network-generated signal from text to speech to be heard on a subscriber's mobile phone headset where a text-to-speech engine is included in the headset;

FIG. 11C is a call flow diagram of an algorithm for translating a network-generated signal from text to speech to be heard on a subscriber's mobile phone where a text-to-speech engine is included in the handset of the mobile phone and the subscriber does not use a headset;

FIG. 11D is a call flow diagram of an algorithm for translating a network-generated signal from text to speech to be heard on a mobile phone handset where a text-to-speech engine is included at the mobile telephone switching office and the subscriber does not use a headset;

DETAILED DESCRIPTION OF THE CURRENTLY PREFERRED EMBODIMENTS

Figure 1:
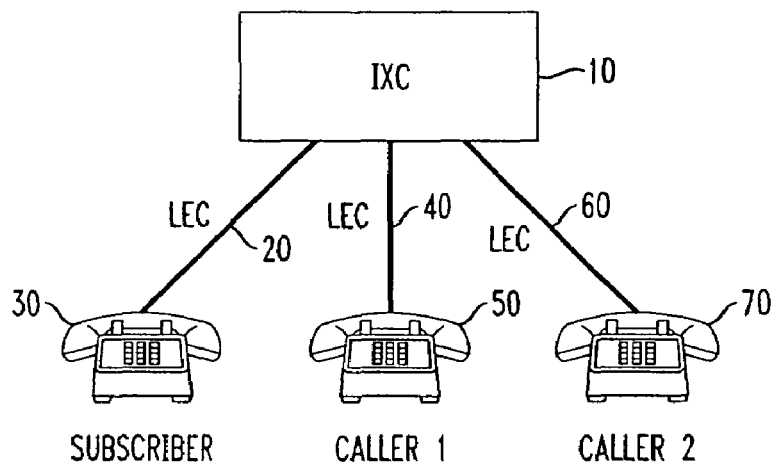
FIG. 1 is a block diagram of a network connecting multiple telephone stations.
Figure 2A:
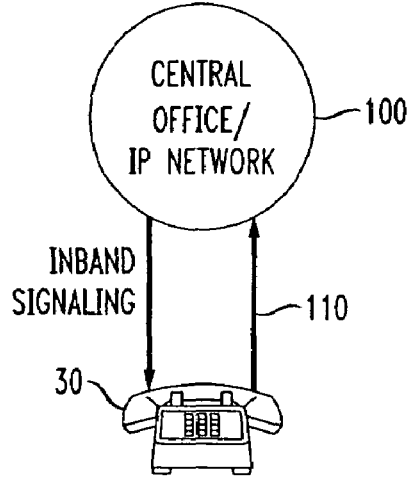
FIG. 2A is a block diagram of a prior art telephone system architecture.

Referring initially to FIGS. 1 and 2A, in a prior art telephone network 15 premise devices 30, 50, 70 are connected to an interexchange carrier (IXC (long distance carrier)) 10 via one or more local exchange carriers (LEC's), also referred to as central offices. Premise devices 30, 50, 70 are shown as connected to network 15 via distinct respective central offices 20, 40, 60. The premise devices 30, 50, 70, such as telephones or other communication devices, such as a computer, television modified for communication, other wired or wireless devices, etc., connect to system node 100, such as a central office/IP (internet protocol) which performs typical central office functions, or to any access management complex/service feature platform in communication with the network that provides access to the central office. A call may, be transferred between two central offices or from a central office to an IXC. There are services and features associated with each local and long distance transmission, network, and carrier.

Figure 3A:
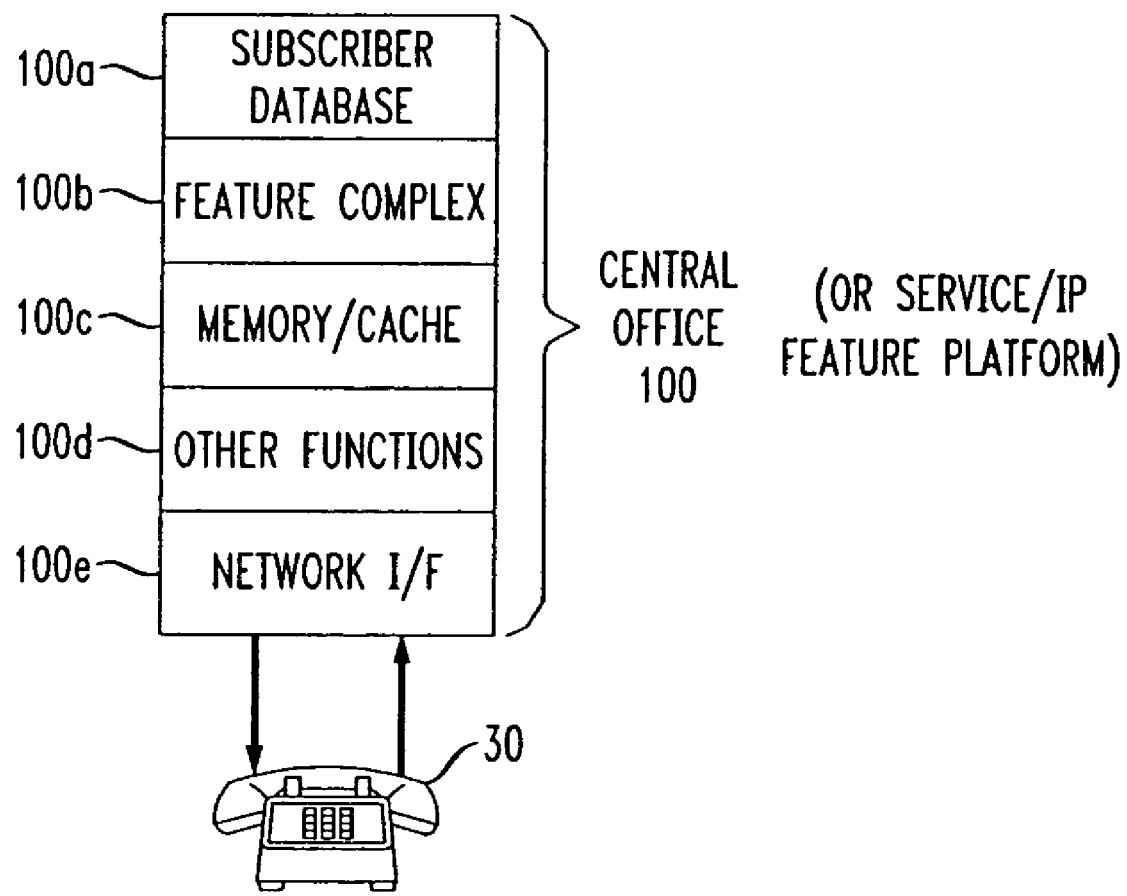
FIG. 3A is a block diagram of at least a portion of a prior art network central office.

A subscriber may listen at and speak directly into one of the premise devices or may use a headset (not shown) for these purposes. One function performed at system node 100 is to track the call flow or "state" of each call using inband signaling so that the network maintains updated status information such as the setup of telephone calls between premise devices, who is on the phone with whom, when calls are placed on hold, terminated or forwarded, etc. Referring to FIG. 3A, node 100 may also have various components, including a feature complex 100b that provides a class of features available to premise devices connected to the network via node 100 (including billing name and address, features available to the subscriber, etc.), a subscriber database 100a with subscriber information for node 100, a cache/local memory 100c, and other components 100d that perform additional central office functions.

Figure 2B:
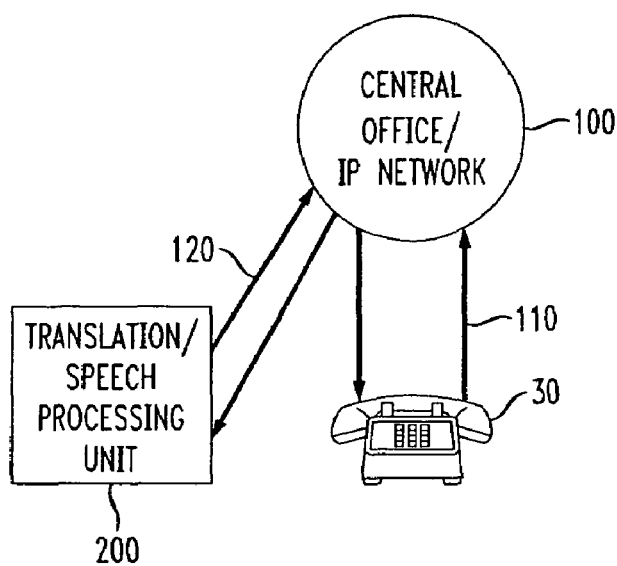
FIG. 2B is a block diagram of a telephone system architecture with a networked speech processing unit according to the present invention.
Figure 3B:
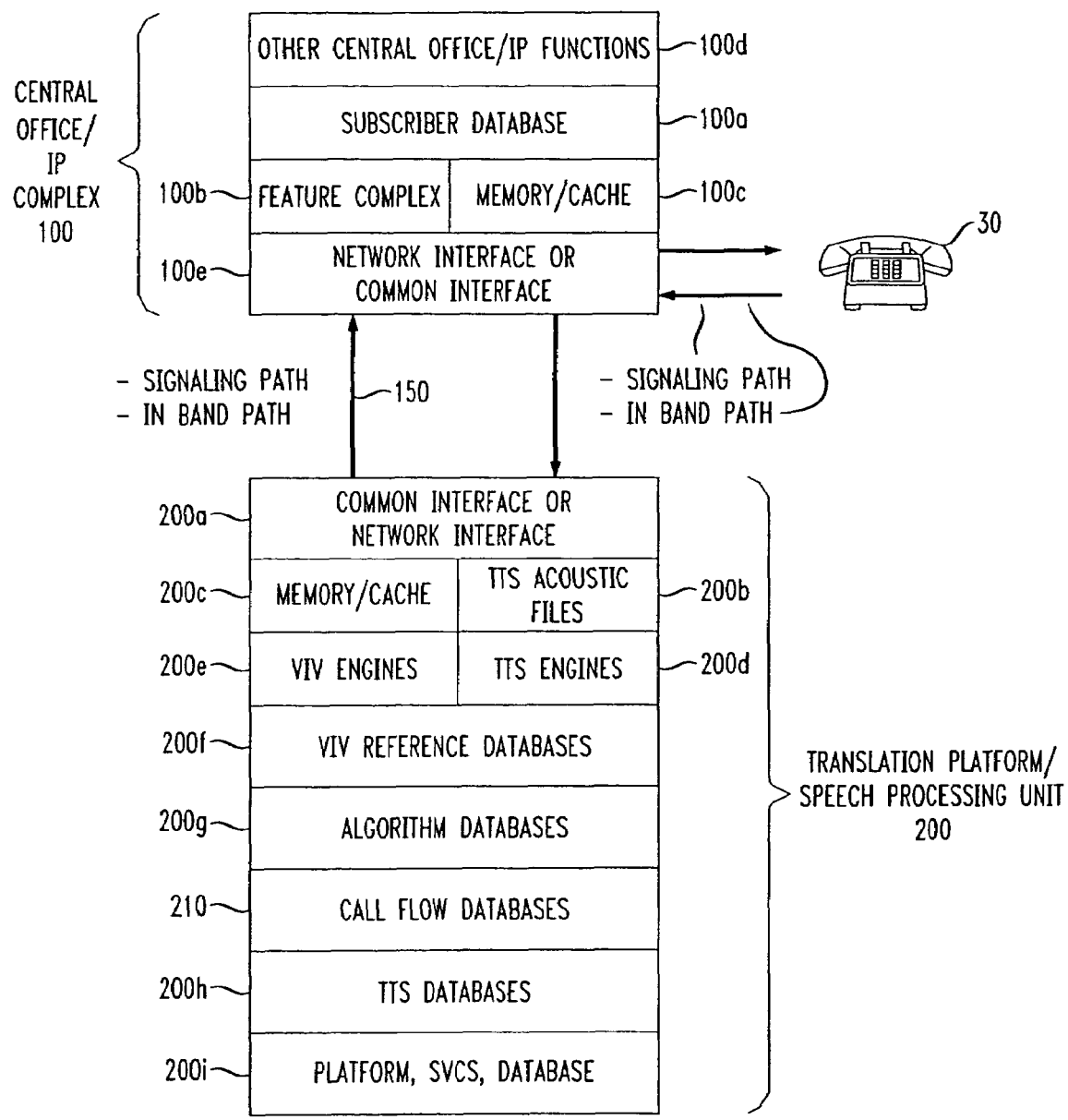
FIG. 3B is a block diagram of at least a portion of the network architecture of the system of FIG. 2B.

The present invention enhances network functionality by adding to network 15 a networked speech processing unit 200 (FIG. 2B) connected to node 100 and universally accessible to any network-based feature available at that node. Each central office requires its own speech processing unit 200 or connectivity to a speech processing unit. (The speech processing unit may also be referred to as a translation platform because it translates an utterance to a command recognizable by the system and can translate system data to an available audio format (form factor) at the audio-enabled device (e.g. telephone.)) Speech processing unit 200 provides a networked voice interface to node 100, over inband path 120 through network or common interfaces 100e, 200a. (FIG. 3B) Signaling or network commands corresponding to a feature or function can be downloaded to the memory of the communication device for future use/access with voice, etc. Stored features can be scrolled and selected by the user.

The speech processing unit 200 should be bridged to the network so as to be able to listen at all times after a user session (such as a call) is initiated with the network (and possibly another caller) for a user's voice commands. To this end, speech processing unit 200 may be permanently connected to the network and the speech recognition functionality is made available to the network once the user session is initiated. Where the speech processing functionality is only available to a user who subscribes to a speech accessible service, then the connectivity is available to subscribing users only. The speech recognition may be turned off during a session.

Speech processing unit 200 includes a Text-to-Speech ("TTS") application, such as the TTS application described in U.S. Pat. No. 4,899,358 entitled Call Announcement Arrangement which is hereby incorporated by reference as if fully set forth herein. The TTS application enables the network to read textual messages containing system information, including call information, aloud to a subscriber, even in the absence of a user interface like a voice, visual, or multimedia prompt. These textual messages that are generated on network 10 in a format such as ADSI (which usually requires a special phone for display) and provide call information, (such as Caller-ID information), are sent to the TTS application at speech processing unit 200 where they are converted to spoken messages and transmitted inband back through central office 100 to the subscriber who can hear the messages without any specially equipped phone. The TTS application comprises a TTS engine 200d that controls the text to speech translation, acoustic files 200b containing the sounds for pronouncing the words of text, TTS databases 200h that define the correspondence of text to speech, and a memory cache 200c in which to temporarily store a received text message for translation.

Speech processing unit 200 further includes an Utterance Verification/Verbal Information Verification ("VIV") application. See, e.g. U.S. Pat. No. 5,649,057 entitled "Speech Recognition Employing Key Word Modeling and Non-Key Word Modeling" and U.S. Pat. No. 5,797,123 entitled "Method of Key-Phase Detection and Verification for Flexible Speech Understanding", which are hereby incorporated by reference as if fully set forth herein. The VIV application enables the network to interpret spoken utterances of the subscriber, particularly those spoken utterances which are commands to the network to provide call information or information about available call management options, or to invoke call management or application features. The VIV application has a VIV engine 200e to perform the speech recognition, and reference databases 200f, for correlating the detected subscriber utterances, interpreting them and translating them into a format that is recognizable by the network element or application.

Algorithm databases 200g in speech processing unit 200 contain one or more algorithms that the system may use for speech recognition. There is at least one algorithm database 200g for each system state represented by a node in the system state database 210, described below. Each of the algorithm databases 200g contains the grammar elements associated with that node and a cross reference to a network element or application command for each grammar element. Additional algorithms per node may also be supplied to provide different levels of speech recognition, for example, as where a first algorithm performs a less sophisticated, relatively quick speech recognition technique while a second algorithm performs a more sophisticated speech recognition technique which is used if the first algorithm is unsuccessful in recognizing the speech. Different models may also be used for speech recognition of males and females, children, people from different countries or regions, etc. who may pronounce grammar in a particular language differently.

A platform services database 200i in speech processing unit 200 contains signaling commands, etc. to correspond with features and services available at the speech processing unit/translation platform 200.

As stated above, a "call flow" is the series of steps that a call follows from the time it is initiated until the call is terminated. Each such step represents a "state" that the system is in at that point during the call's progress. At certain steps, there are multiple alternatives from which a subscriber can choose. For example, a subscriber might put a call on hold or conference that call into another call. The number of different paths that a subscriber can specify at any particular point in the call flow is finite. A spoken utterance, which is essentially a voice command, can specify the path that is to be followed at a point in the call flow. A system state database 210 that may be resident at speech processing unit 200 or elsewhere in the system can specify a unique grammar or "reserved words" that a subscriber may utter at each system state to serve as the voice command to select a desired feature available at that state, such as a call management function. Only that predetermined grammar will be accepted as input to invoke a call management feature appropriate to the particular state, such as the particular stage of the call flow. A reserved word need not be an actual word but may instead be a mnemonic.

Figure 4:
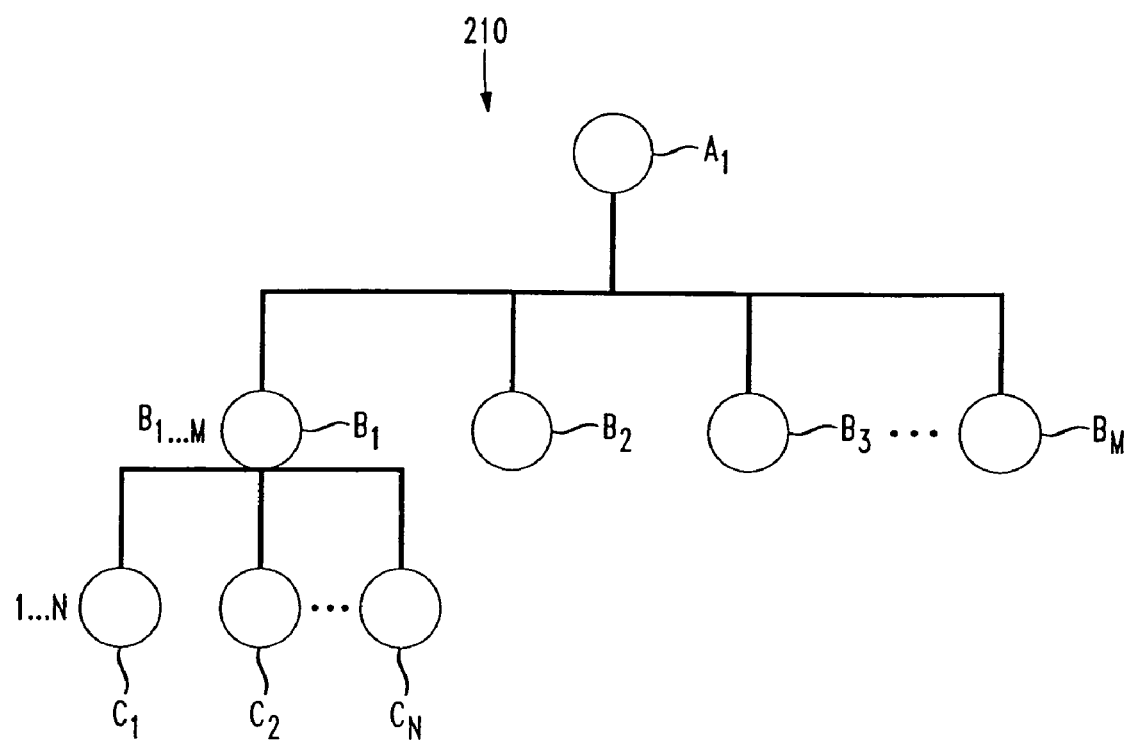
FIG. 4 is a block diagram of a system state database in the networked speech processing unit for a call flow according to one embodiment of the invention.

A system state database 210 generally has the tree-shaped structure shown in FIG. 4. In one example of a system state database 210, node $A_1$ may represent a subscriber engaged in an existing call. There are M possible states, represented by nodes $B_1$-$B_M$, to which the call may proceed from node $A_1$. Nodes $A_1$ and nodes $B_1$-$B_M$ store grammar appropriate to a particular state to activate the different features available to a subscriber at each respective node at central office 100 or call management complex for managing the call. For example, node $B_1$ may represent a new, additional incoming call to the subscriber and available respective subscriber commands to invoke features appropriate to node $B_1$. For example, a subscriber may say a word at $B_1$ that is descriptive of the action that the subscriber wishes to be performed, such as saying the word "Menu" to obtain a spoken menu of the available features which may be selected. Alternatively, a subscriber may say "Conference" to conference the new call into the existing call, "Hold" to place the new caller on hold, "Voice Mail" to send the new caller into voice mail, "Take Call" to connect the subscriber to the new incoming call and to place the existing call on hold, "Will Call Back" to bookmark the Caller-ID for a list of calls to be returned, "Caller-ID" or more simply "Who's Calling?" to have the network read the caller identification information for the new caller. The "reserved words" themselves are defined in VIV reference database 200f. The database also includes within each of the respective nodes synonyms of the reserved words for the respective node. For example, instead of "Menu" the subscriber may say "List" or "Features", instead of "Conference" the subscriber may say "Bridge", "Join", or "Merge", instead of "Hold" the subscriber may say "Wait", and instead of "Voice Mail" the subscriber may say "Message", "Announcement" or "Play Message". Additionally, the respective nodes may include globally-available commands, such as "help", "repeat", "back", and "select language". These globally-available commands may be saved at a respective node or may be stored elsewhere and made available as an option at each node. Branching from nodes $B_1$ . . . $B_M$ are additional respective nodes $C_1$-$C_N$ at which grammar, including synonyms, usually for later system states are stored. For example, where a subscriber gives the command to "conference" the call at node $B_1$, the subscriber may thereafter invoke the "hold" or "transfer" command at node $C_1$ which is a node that branches from node $B_1$. Other nodes $C_2$ . . . $C_N$ may branch from node $B_1$ for alternative call flows.

It should be understood that a particular call flow or group of related system states may have a state at which there is a change of system state from a system state represented by a lower node in database 210 to a higher system state (e.g. a move from node $B_1$ to node A). It should also be understood that the system state database 210 may, depending on the system state, be entered at any node, including any branch or leaf of a tree-shaped database structure, rather than only at the top node A.

Node $B_2$ represents a different state than node $B_1$, such as a state in which the subscriber has received an incoming call from the second caller while on the line with the first caller but the second caller has hung up. If a subscriber utters an incorrect utterance that is not within an acceptable grammar for the respective step in the call flow at which the utterance is spoken, the system might not respond at all, or can indicate to the subscriber that the utterance is not recognized.

The system may also allow for utterances in more than one language by providing multiple system state databases 210, one per language, each of the databases 210 having appropriate grammar for the language of that database. For example, the subscriber may utter a reserved word to access a call management feature and the system will recognize not only whether the word is acceptable grammar for that context but also the language of that word. Thereafter, the network will switch to the system state database 210 for the recognized language and interact with that subscriber in the language of the uttered reserved word. Uttering the reserved words in another language will, on the other hand, redirect the call to another system state database for the recognized language, or the system state database 210 may incorporate foreign reserved words in appropriate nodes for recognition without the need for separate databases. However, incorporating too many reserved words at a particular node may impact the ability to perform speech recognition of relatively reduced complexity. In addition to interpreting subscriber utterances in the selected language, the language of the subscriber utterance may be used by the TTS application to read the utterance to the subscriber in the same language. If there is any ambiguity as to what the subscriber has said (i.e., ambiguity as to the utterance, which may also be referred to as an "acoustic input"), this can be handled by the VIV application at speech processing unit 200 using well-known algorithms such as Hidden Markov Models, word spotting or word combinations, and user interface techniques (such as prompt for confirmation or requiring a combination of utterances, key presses, etc. as input to the system). The functionality of the speech recognition may be enhanced by the use of a subscription-type service wherein a given subscriber provides a voice model of the subscriber's voice that is used by speech processing unit 200.

Figure 5A:
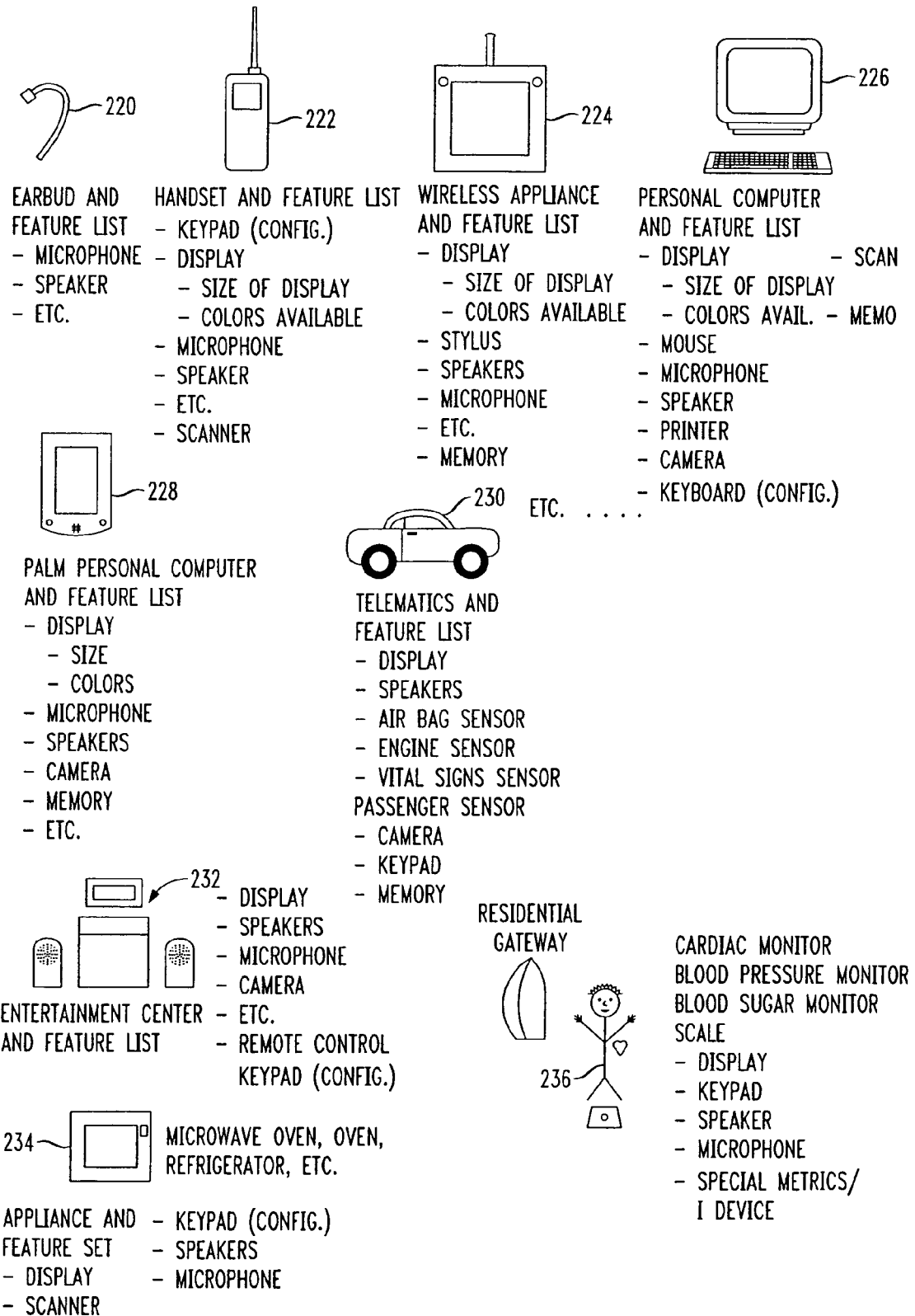
FIG. 5A depicts some of the possible "target" devices with which a system can communicate and some possible features of the target devices.

Some communication devices that may communicate with the network and sample profiles of those "target" devices include the devices and sample profiles shown in FIG. 5A: earbud 220, mobile phone 222, wireless appliance 224, personal computer 226, personal digital assistant 228, telematics 230 for a vehicle which may have features like a telephone, email and sensors like air bag, engine, vital signs, and other passenger sensors to communicate with a central office when there is a problem, an entertainment center 232 having communication functions, an appliance 234 like a microwave oven, oven or refrigerator, that has communications functionality like email functions, and a Residential Gateway 236 (shown in more detail in FIG. 14) having features such as cardiac, blood pressure, sugar and scale monitors of a person at a location of interest. In exchanging messages with these devices, it is of course necessary to send a message packets in the device formats.

The profile of a device is sent by the particular device to the network when the device shakes hands with the network at session setup. The Bluetooth protocol is one protocol in which profiles are exchanged between devices and between a device and the network. Thus, the network knows the device protocol when the network sends inband signals to the device. Where multiple types of devices communicate with a particular network 15, system state databases may also include profile databases that contain profiles for communication devices which communicate in voice and/or data with the network 15 such as devices to which commands are transmitted. The target communication device profiles are defined and stored in a database look up table (LUT) at speech processing unit 200, such as the database LUT 240 shown in FIG. 5B, which also specifies the format from the available translation formats for translating features from a data format to the appropriate audio form factor and vice versa. For example, the profile for earbud$_1$ shows that earbud$_1$ has a speaker and microphone and uses a Form 1 translation format, which is a format suitable for this device.

Figure 6A:
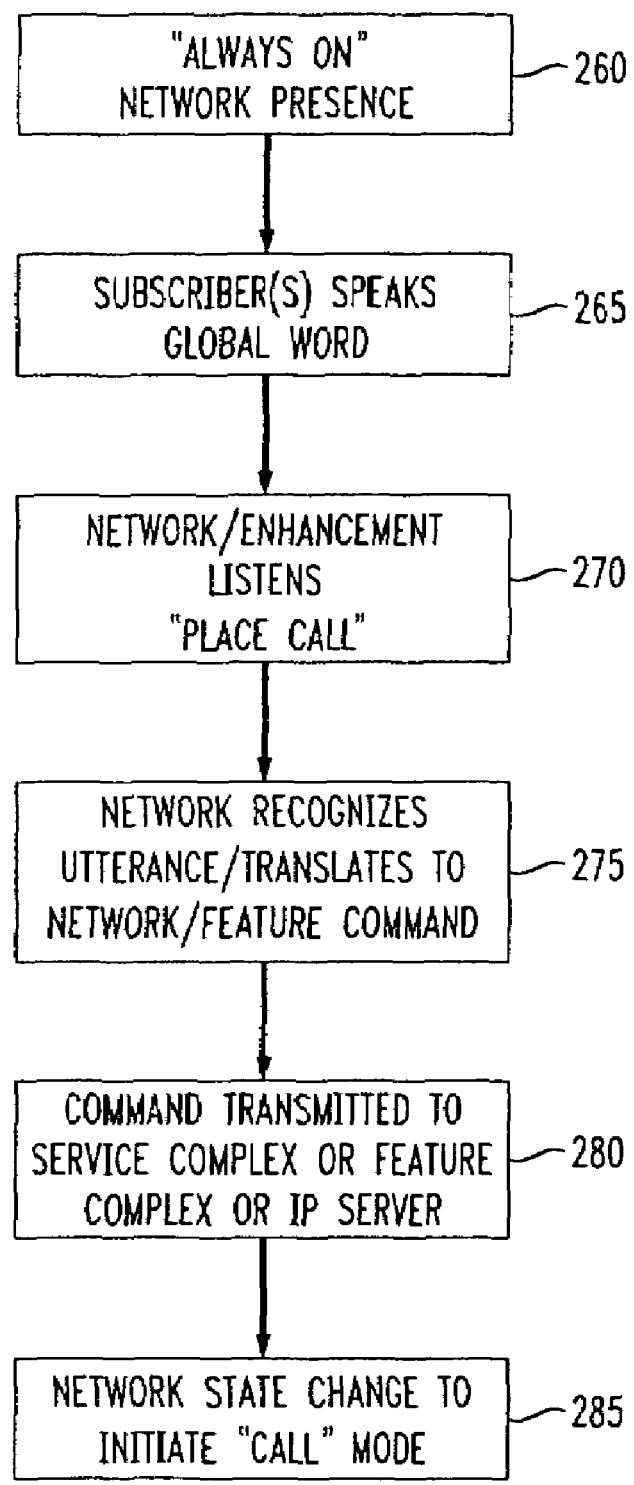
FIG. 6A depicts a flow chart of steps for a subscriber to effect a change in system states by a spoken utterance.

Some of the various possible call flows and other system states which can be handled by the present invention are now discussed. FIG. 6A depicts one example of the steps for a subscriber to change system states. At step 260, the network is in a state where it is "Always on" and the phone is "on-hook" (for a phone) or "connected but not in use" for some other device. In this state, various actions may occur. For example, subscriber S may receive information that an information provider pushes to his terminal (e.g. advertisements) possibly without ringing the phone (e.g. suppressed ring function), or may lift up the phone or activate another device, or access network messages, data, or information. In the illustrated example, subscriber S speaks a globally available word to get the system's attention at step 265. The network (or network enhancement comprising the speech recognition and text-to-speech functionality) listens for a command and, in this example, subscriber S says "Place call" (step 270). (Rather than initiating a call, subscriber S may just initiate a communication with the network at step 270, which would send the messages, etc.) At step 275, the network recognizes the utterance and translates the utterance to a network feature command. The command is translated to feature complex 100b or to a service complex (step 280), which causes the network state to change to "Initiate call" mode (step 285).

Rather than simply allowing a subscriber to begin entering voice commands, a subscriber may have to invoke a specific command at a particular system state that indicates to the system that the words that follow are instructions to the system and not a conversation among subscribers. For example, the subscriber may have to say the word "Computer" or some uncommon word that will not generally be used in a conversation in order to access the menus. In response, a noise, such as a chirping noise, may then be played to indicate that voice commands can be now be entered. This access restriction prevents the subscriber from accidentally triggering the voice command system while engaged in a conversation and expands the amount of grammar that can be used at a particular node.

Figure 6B:
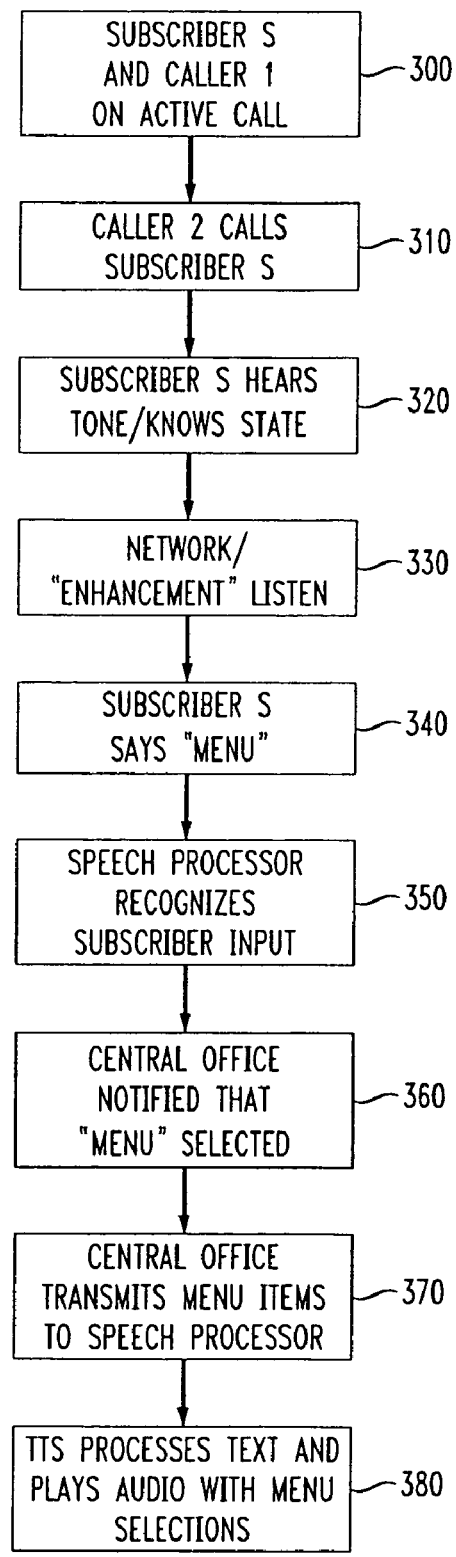
FIG. 6B is a flow chart of a call flow utilizing menu prompting.

Once a call is initiated, an example of a suitable "Request Menu" call flow during which a subscriber can ask to receive a spoken menu of the available choices at a point in the call flow is shown in FIG. 6B. At the start of the call flow (step 300), a call between subscriber S using telephone 30 and caller 1 using telephone 50 is in progress (FIG. 1). At step 310, caller 2 at telephone 70 calls subscriber S and subscriber S then hears a "call waiting" tone at telephone 30 generated by the network central office 100 (step 320). The "call waiting" tone may be a unique tone that indicates to the subscriber the feature that he or she can interact with. The tone may also suppress the voice channel to other callers so that the tone is not heard by others.

At step 330, the network central office "listens" to determine whether or if subscriber S presses plunger (also known as a switch hook) on telephone 30 or enters a DTMF input on a keypad of telephone 30. At the same time, speech processing unit 200 listens on inband path 120 for subscriber S to recite any node-appropriate reserved words, as an alternative to listening for plunger or DTMF input. Depending on a user-selectable setting, the voice channel to caller 1 either remains suppressed after the call waiting tone to listen for any reserved words, or subscriber S must first place caller 1 on hold to deal with the incoming call and can then utter an appropriate reserved word. At this step 330, the reserved words listed in a system state database 210 will be a word or words that provide subscriber S with an audio menu of grammar appropriate to that point in the call flow. At step 340, subscriber S utters a reserved word such as "Menu". Speech processing unit 200 uses word spotting and utterance verification with VIV to recognize the "Menu" command from subscriber S, first referencing system state database 210 to check whether the voice command is an allowed context-specific word (step 350). Speech processing unit 200 notifies central office 100 that the "Menu" function was selected (step 360). In response, central office 100 transmits a textual list of appropriate menu items, which are the features made available by feature complex 100b, to speech processing unit 200 (step 370). The TTS application processes the received text and plays audio to subscriber S, via central office 100, as a spoken menu that is read aloud to advise subscriber S of the available features from which subscriber S may now select (step 380). As indicated above, some typical call management features available at central office 100 include "Conference" (caller 2 conferenced into existing call), "Hold" (places caller 2 on hold), "Voice Mail" or "Play Message" (sends caller 2 into voice mail), "Take Call" (connects subscriber S to caller 2 and places caller 1 on hold), and "Caller-ID" (reads the caller identification information to subscriber S).

Figure 5C:
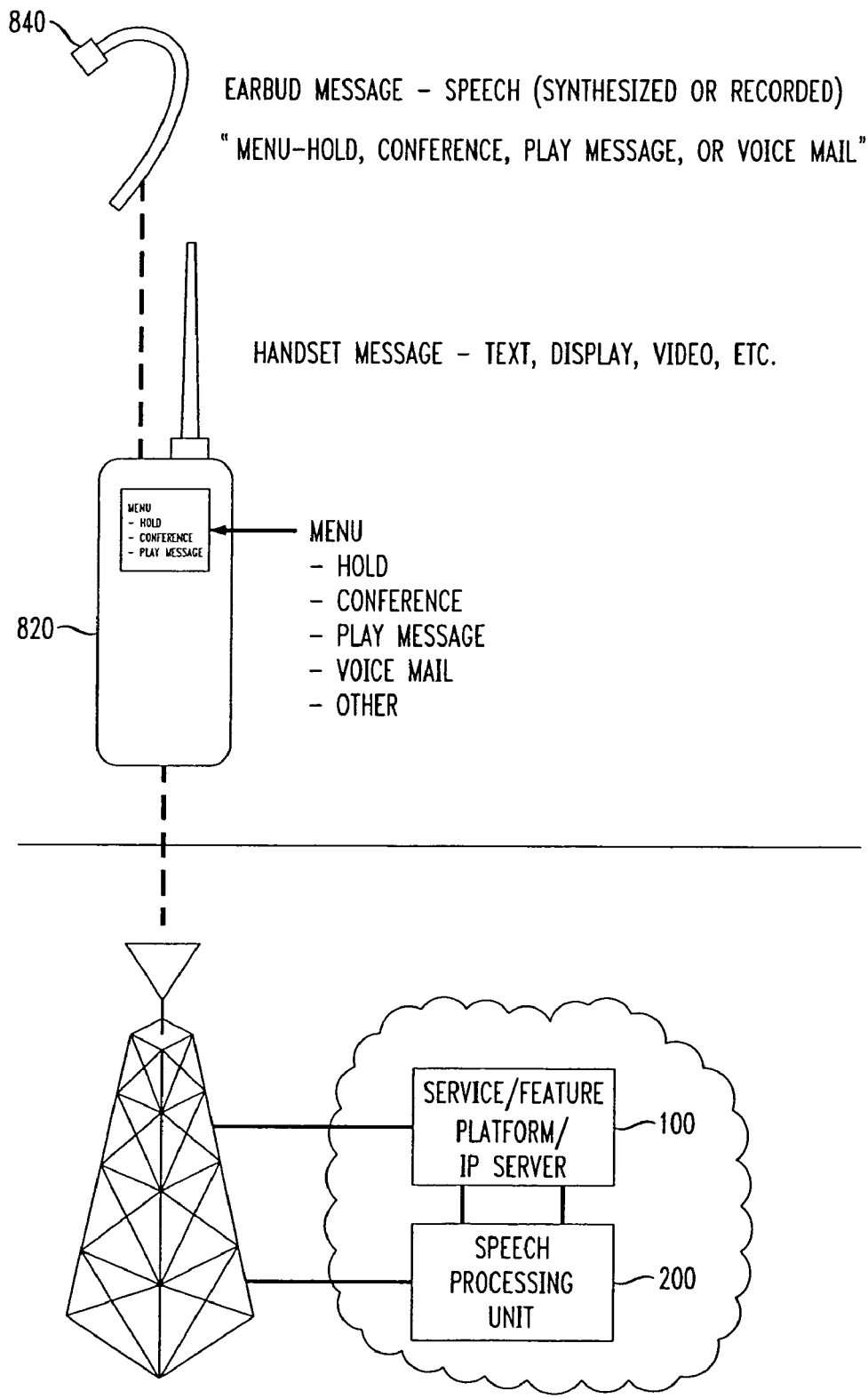
FIG. 5C depicts the abbreviated display of a menu that is also provided to a subscriber as a spoken menu.

The menu of available features at that node may also be displayed on a display, if available either when the spoken menu is requested or earlier at a point when the call flow is directed to that node. Because of the relatively small size of a display on telephone 30 or a mobile terminal 820 that cannot display all menu options at once, the options are displayed generally in an abbreviated or abridged fashion (e.g. only certain commands or using acronyms or other abbreviations), as shown in FIG. 5C. (The spoken menu may be heard for example at mobile terminal handset 820 or earbud 840.) The benefits of visually seeing even an abbreviated menu include allowing a subscriber to determine one or more menu choices if he missed or could not comprehend a choice in the spoken menu and serving as another reminder of the available options.

Figure 6C:
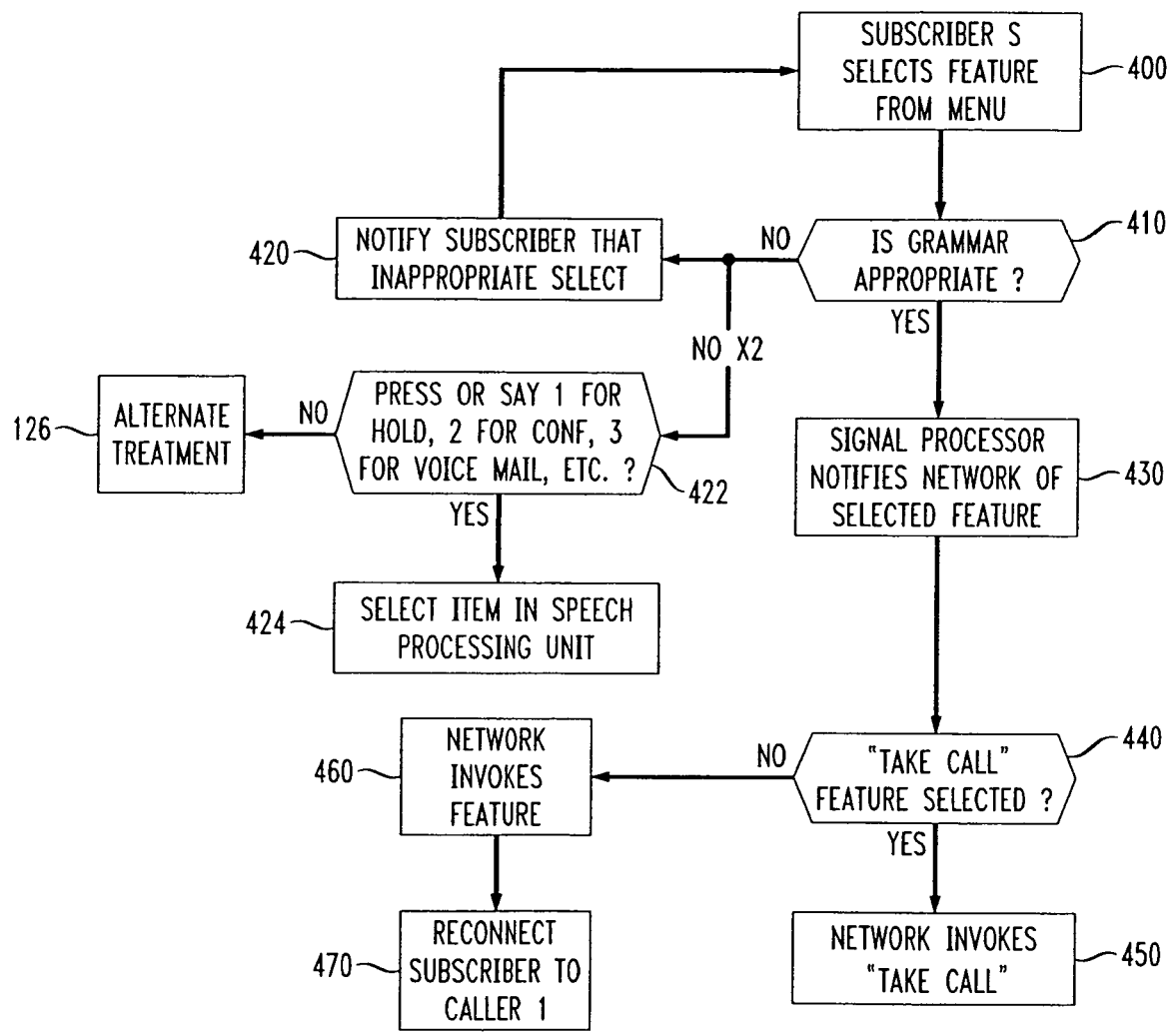
FIG. 6C is a flow chart of a call flow for subscriber feature selection following menu prompting.

The "Request Menu" call flow leads into the "Select from Menu" call flow shown in FIG. 6C. Subscriber S selects an available feature from the recited menu (step 400) by reciting an appropriate reserved word or words, which may include words to activate a node-specific or globally available feature. At step 410, speech processing unit 200 looks in the system state database 210 and compares the recited words to the list of context-appropriate grammar to determine if the recited words are allowed. If the words do not appear at the appropriate node in the database, subscriber S is notified that the selection is an inappropriate selection (step 420) and is returned to step 400 or, alternatively, subscriber S may be permitted to return to step 340 (not shown) to request that the menu be read again. If subscriber S says grammar again and the recited grammar is unrecognized a second time at step 410, the algorithm proceeds to step 422 where subscriber S can try to utter proper grammar again or may enter a selection on a keypad. For example, subscriber S may be presented with a spoken menu that says "Press or say 1 for Hold, 2 for Conference, 3 for Voice Mail. If the subscriber utterance is recognized at step 422 or the subscriber presses an appropriate key, then the proper item is selected in speech processing unit 200 (step 424) and the algorithm proceeds to step 430. If the subscriber utterance is not recognized, then the subscriber may be given some other alternative at step 426. If the words recited by subscriber S are recognized as reserved words (including globally available words) at steps 410 or 422 or an appropriate key is pressed, then the call flow continues to step 430 where signal processing unit 200 notifies the network as to which feature was selected. If the "Take Call" feature is selected (as determined at step 440), the network puts caller 1 on hold and caller 2 is connected to subscriber S (step 450). If the "Take Call" feature is not selected, then network 100 invokes the selected feature (step 460) and reconnects subscriber S to caller 1 (step 470). When a voice prompt is being played, as at steps 340 or 380, subscriber S may just "barge in" and recite a reserved word to invoke a desired feature immediately if there is an echo canceler in the network 100.

A particular node in system state database 210 may represent the function of exiting a routine or terminating a call. A list of available words for this function would be included in a grammar for that node. The available words at that node may include, for example, "hang-up", "end call", "terminate", "good-bye", "go away", "scram", and "exit".

Figure 7:
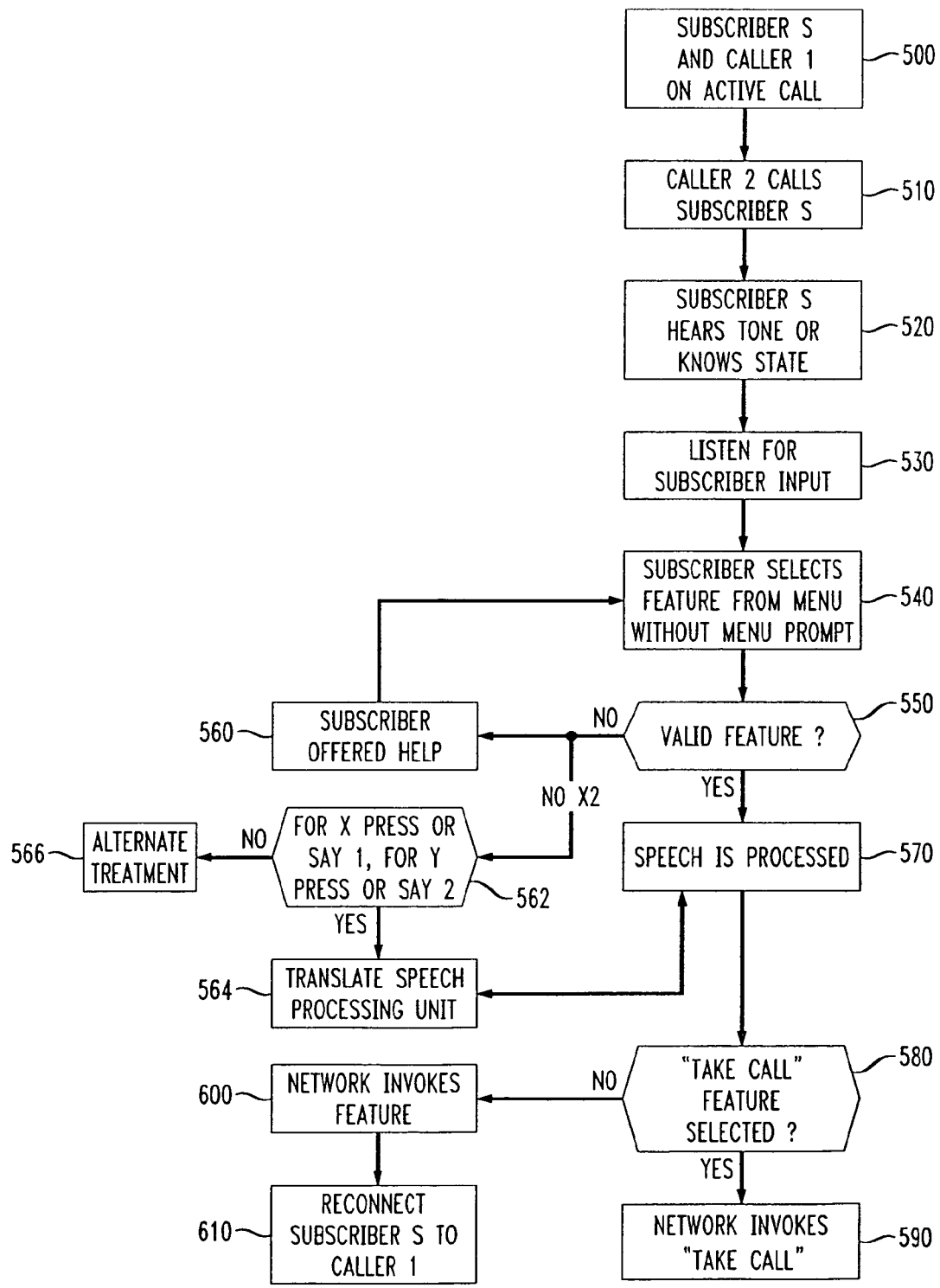
FIG. 7 is a flow chart of a call flow for subscriber feature selection without menu prompting.

FIG. 7 depicts a flow chart of an alternative to the combined Request Menu and Select from Menu call flows. This "Select from Menu, No Prompt" call flow offers subscriber S the alternative of selecting a feature for processing an incoming call from caller 2 without prompting the subscriber with the available menu selections, thereby avoiding steps 340-380. In this alternative call flow, subscriber S and caller 1 are engaged in a call (step 500) when caller 2 calls subscriber S (step 510). Subscriber S hears a call waiting tone (step 520). At step 530, the network central office "listens" to determine whether subscriber S has depressed the plunger on telephone 30 or entered a DTMF input using a keypad of telephone 30. Speech processing unit 200 also "listens" on inband path 120 and waits a predetermined number of seconds for subscriber S to recite any reserved words. At step 540, subscriber S may select an available feature, which he or she knows to be available, by reciting a reserved word. The call flow determines at step 550 whether the recited words are valid reserved words in system state database 210 for invoking an available feature, whether a node-specific feature or a globally-available service or feature. If the recited words are not recognized as reserved words or if the subscriber says nothing and the timeout period ends, subscriber S is prompted to access the help menu and, if the subscriber responds affirmatively after a prompt, he is offered the help menu at step 560. If subscriber S says grammar again and it is unrecognized a second time at step 550, the algorithm proceeds to step 562 where subscriber S can try to utter proper grammar again or may enter a selection on a keypad. For example, subscriber S may be presented with a spoken menu that says "Press or say 1 for Feature 1, 2 for Feature 2, 3 for Feature 2. If the subscriber utterance is recognized at step 562 or the subscriber presses an appropriate key, then the proper item is selected in speech processing unit 200 (step 564) and the algorithm proceeds to step 570. If the subscriber utterance is not recognized, then the subscriber may be given some other alternative at step 566. If the recited reserved words are recognized as valid at step 550 or step 562 or an appropriate key pressed, then signal processing unit 200 processes the acoustic signal at step 570, using word spotting and utterance verification with VIV to recognize the recited words, and notifies the network as to which feature has been selected. If the "Take Call" feature is selected, as determined at step 580, the network puts caller 1 on hold and caller 2 is connected to subscriber S (step 590). If the "Take Call" feature is not selected, then the network invokes the selected feature (step 600) and reconnects subscriber S to caller 1 (step 610).

The "Select Language" call flow (FIG. 8A) described above permits the automated selection of the language in which subscriber S converses with the network. At step 640, the present system state of the network is identified at a node "x" which triggers a particular operation associated with the node. The "Select Language" call flow can be invoked, for example, in the "Request Menu" call flow before step 320 or in the "Select from Menu, No Prompt" call flow before step 520. At step 650, subscriber S hears a tone generated by the network that is appropriate to the particular state of the system or call, such as a tone indicating that there is a call waiting, or instead of hearing a tone the subscriber just recognizes the system state, and speaks an appropriate command. Subscriber S must respond within a predetermined number of seconds. At step 651 (which is optional), the system may determine a particular type of recognition model to use to identify and/or recognize the spoken command using the algorithm described below with respect to FIG. 8B. If step 651 is performed, the system thereafter proceeds to step 690. If step 651 is not performed, the system proceeds to step 669 where the grammar spoken by subscriber S is identified at the appropriate node on system state database 210 as belonging to a particular language by referencing database 210. Thereafter, the speech processing unit 200 operates in the identified language for both input and output by branching to appropriate grammar/language functions at step 670, such as English 680*a*, Spanish 680*b*, Italian 680*c*, French 680*d*, etc. Thereafter, the grammar at state "x" is recognized (step 690), the word(s) represented by the grammar is recognized (step 700), the feature represented by the recognized word(s) activated (step 710) and the call state is changed or updated (step 720).

Males, females, children, and people from different backgrounds, parts of a country, ethnicity, etc. pronounce words differently. It is advantageous to create various speech recognition models with separate templates for each group of people. These templates can then be used to determine whether a subscriber belongs to a particular group of persons and, if such a determination can be made, the comparison in FIG. 8B between a spoken utterance and grammar at a node of a system state database can be simplified. Rather than having to compare the spoken utterance to a template comprising multiple pronunciations of a reserved word for all types of people, the comparison can be limited to pronunciations only for one type (e.g. compare to male pronunciations in the template when the subscriber is a male). This simplification also is advantageous in that it allows a larger set of grammar to be used because the fewer comparisons that need to be made for speech recognition, the less possibility for confusing the recognition of a particular word.

Figure 8A:
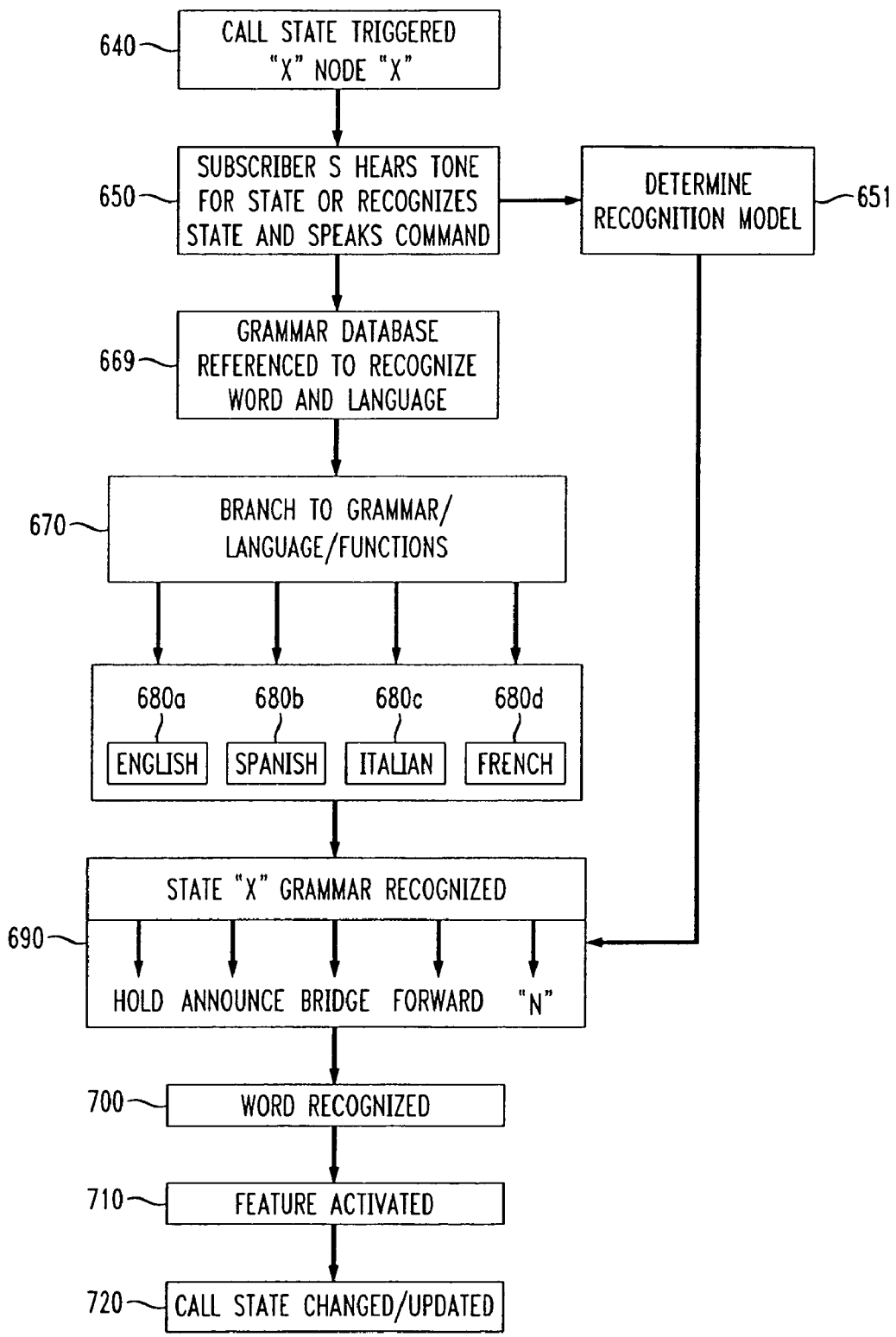
FIG. 8A is a flow chart of a call flow for subscriber language selection.
Figure 8B:
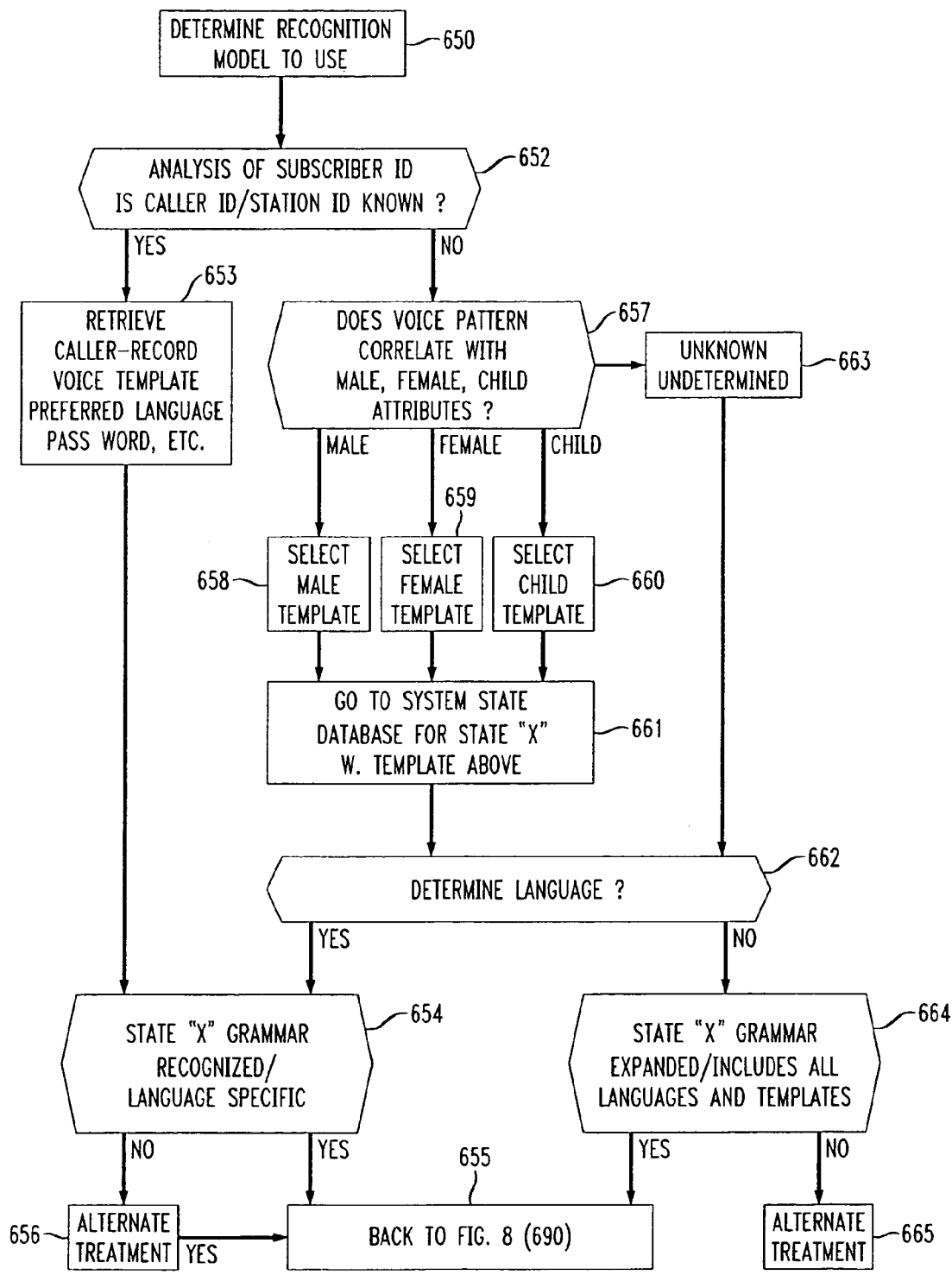
FIG. 8B is a flow chart of a method according to one embodiment for determining whether a particular speech recognition model may be used for speech recognition.

FIG. 8B is a flow chart illustrating the steps, according to one embodiment, for determining what recognition model to use at optional step 651 of FIG. 8A. At step 652, the system checks whether the subscriber ID is a known caller-ID or station ID (e.g. a subscriber's phone number) by searching a caller record database 666, an example of which is shown in FIG. 8C. If the subscriber ID is known, then at step 653 the record for that subscriber is retrieved, if any new subscriber information is provided. Database 666 may provide various types of caller information for that caller, such as caller record, voice template, preferred language of that caller, password, etc. For example, a first record in database 666 shown in FIG. 8C is for caller ID (732) 555-1111. This first record is assigned customer ID number 0231, uses voice template "File 0231", has a password/key of "turtle", the preferred language for that subscriber is English, and the subscription information indicates that this subscriber uses remote access. The information in database 666 may be compiled by any provisioning method, such as by requiring a user to enter user profile and preference information and a means of updating the database should be provided.

At step 654, a subscriber-specific, language-specific grammar database, which correlates the subscriber's utterances to particular commands, is accessed to attempt to recognize the spoken grammar using a language-specific grammar database. If the grammar is recognized as appropriate for the current system state, the system at step 655 returns to step 690 of FIG. 8B. If the grammar is not recognized at step 654, at step 656 an alternate method of treatment (grammar recognition) may be attempted. If the alternate treatment accomplishes grammar recognition, the system proceeds to step 690 of FIG. 8B. Otherwise, the subscriber should be requested to repeat the spoken utterance.

If the subscriber ID is not known at step 654, at step 657 the system checks whether the voice pattern of the subscriber correlates with predefined male, female or child attributes that are defined in available templates. If the voice pattern does correspond, then the appropriate male, female or child speech recognition template 658, 659, 660, respectively, is selected and the system proceeds at step 661 to the node corresponding to the system state in the system state database 210 to check whether a reserved word has been uttered. If possible, the language of the utterance is determined at step 662 (in a manner equivalent to steps 670 and 680 of FIG. 8A). If the language cannot be determined at step 662, at step 664, grammar for all languages and templates is compared to the spoken utterance. If the spoken utterance is now recognized, the system proceeds to step 655 which returns the system to step 690 of FIG. 8A. Otherwise, an alternate treatment to attempt speech recognition is attempted at step 665. If the language of the spoken utterance is recognized at step 662, a language-specific grammar is compared to the spoken utterance at step 654.

Figure 9:
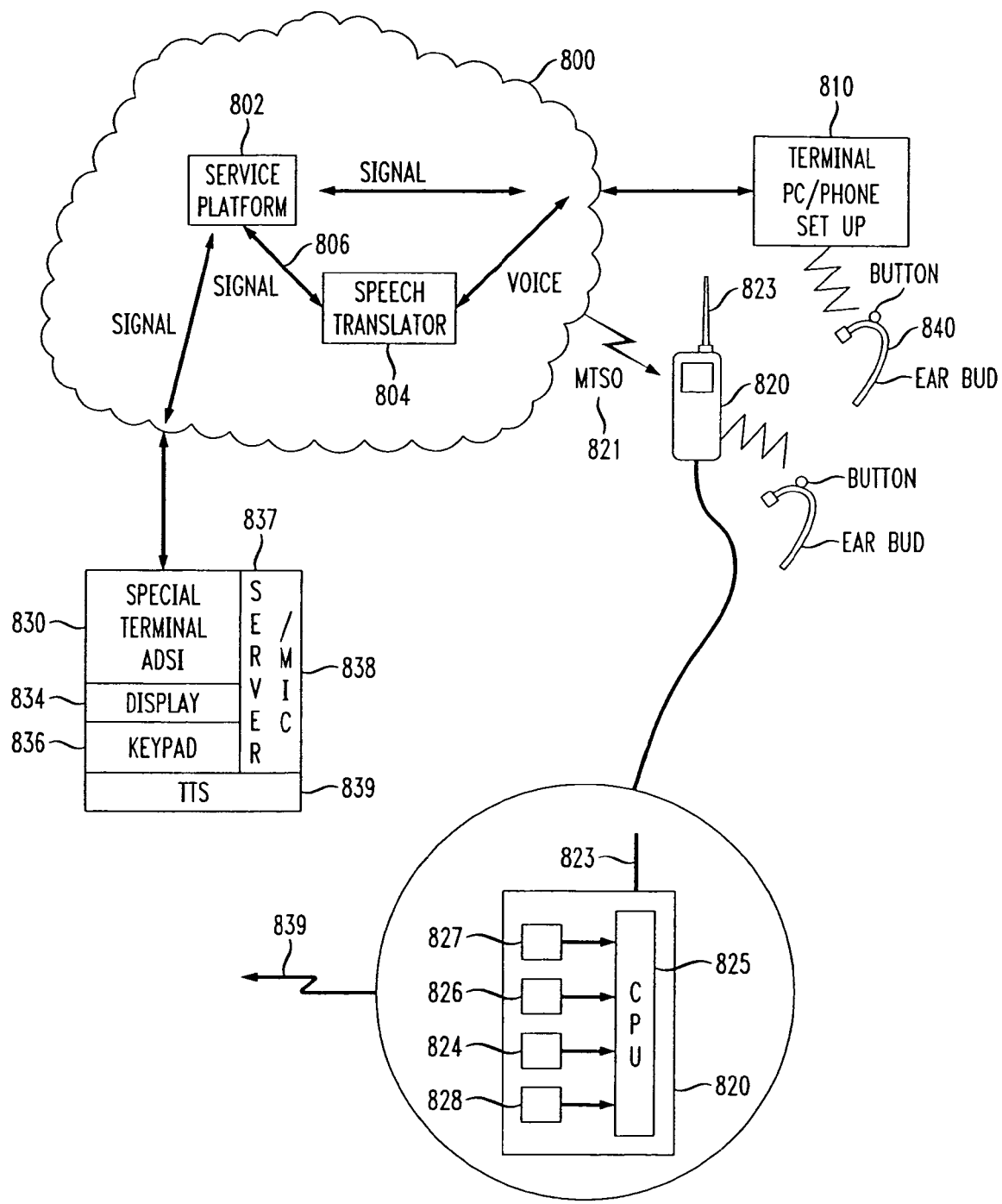
FIG. 9 is a block diagram of a network connecting a combination of devices, including a mobile phone and headset.

Referring to FIG. 9, the speech processing system of the present invention may be similarly interfaced with a mobile cellular network 800. Call flows akin to those described above may be used with networks 800, including any type of network or the Internet, to communicate with a mix of devices including devices 810 such as ordinary telephones and PC computer terminals having a wired connection to the network, mobile devices/terminals 820 that interface with the network over a mobile telephone switching office (MTSO) 821 (which is the equivalent of the central office in the mobile universe), and specialized devices 830 such as ADSI phones. Network 800 includes a service platform 802 and a speech translator 804 between which signals 806 pass. In lieu of placing speech translator 804 directly on the service platform 802, translator 804 may be located outside of service platform 802 but otherwise linked thereto. Mobile device 820 comprises a mobile phone handset 822 or a personal digital assistant (PDA) 228 such as a Palm Computing device, that has an antenna 823, keypad 824, CPU 825, display 826, speaker 827, and microphone 828. Device 830 is shown as a telephone with built-in ADSI support, a display 834, a keypad 836, a speaker 837, a microphone 838, and an optional TTS engine 839.

Figure 10A:
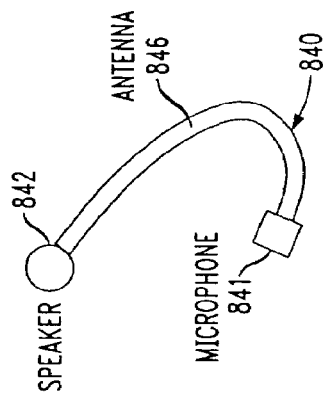
FIG. 10A is a perspective view of an earbud headset that may be used with a mobile phone, PC terminal, or ordinary telephone.
Figure 10B:
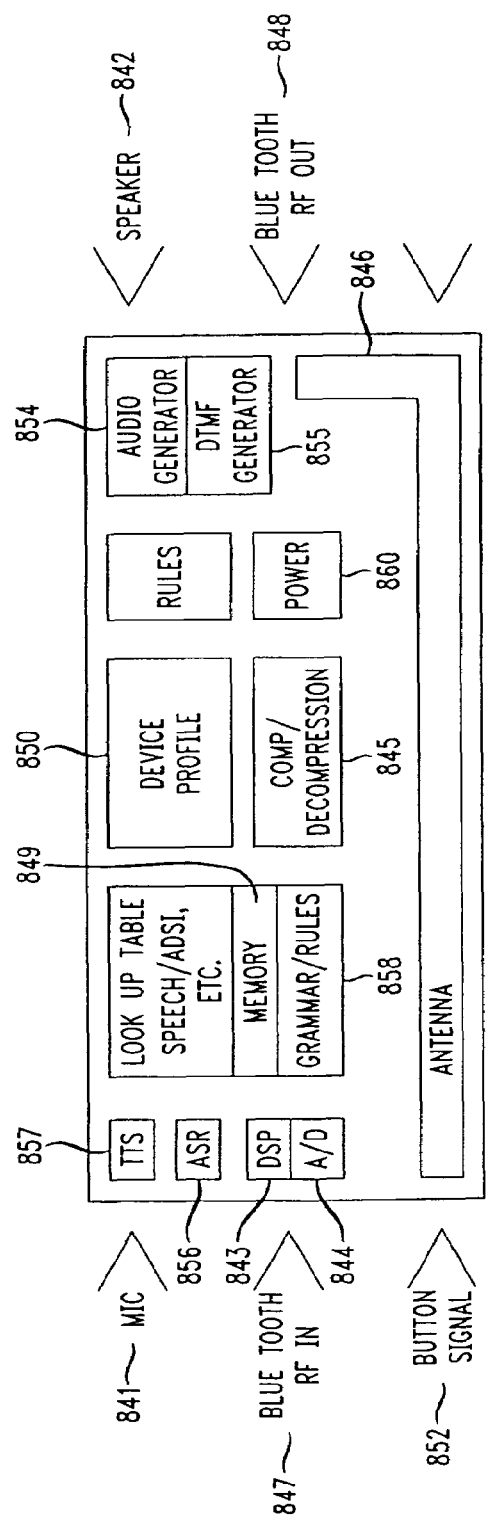
FIG. 10B is a block diagram of the components of the headset of FIG. 10A.

A subscriber may use mobile terminal 820 with a headset 840 such as a wired headset to be plugged into a jack (not shown) on handset 822 or a wireless headset such as the earbud headset shown in FIG. 10A. Wireless headset 840 communicates with handset 822 over a short range communications link 839, such as a Bluetooth link. FIG. 10B depicts the relevant components of headset 840. More particularly, headset 840 comprises a microphone 841 for communicating with other subscribers and entering voice commands, a speaker 842 to enable a. subscriber to listen to other subscribers and to text menus of commands that are translated to speech, a digital signal processor 843, an A/D converter 844 to convert voice commands to a text-based signal, compression/decompression functionality 845, data transfer functionality using antenna 846, Bluetooth RF-in 847, and Bluetooth RF-out 848 to send signals to other external devices like handset 822 or personal digital assistant 228 to generate a tone for transmission to network 800, a memory 849, a profile of the headset capabilities 850 stored in memory 849, activation buttons 852 such as a plunger to signal the handset 822, an audio generator 854, a DTMF generator 855, automatic speech recognition (ASR) capabilities 856 (whether implemented in hardware or software), a TTS engine 857, grammar rules 858, and a power supply 860.

Microphone 841 allows a subscriber to speak into headset 840 and to thereby communicate voice commands to the network 800. In a first scenario, the voice command may be output from Bluetooth RF-out 848 of headset 840 as a voice payload and transmitted via a baseband layer of the Bluetooth link to the input of another Bluetooth-enabled device such as handset 822 or PC terminal 810 where a system state database 210 is located (database 210 may of course be located elsewhere where it is accessible such as at speech processing unit 200) and is referenced to convert the voice command to a network-recognizable signal such as an ADSI command. The database 210 and LUT 240 alternatively may be located at the headset 840, MTSO 821, or at speech processing unit 200. In a second scenario, the voice command may be interpreted by a speech recognition component 856 (or by a separate VIV or UV application) that may be installed in headset 840, which seeks the command in a look-up table installed locally at headset 840. The LUT 240 at headset 840 outputs the appropriate signal through the handset 822 which is then converted by LUT 240 to an ADSI signal before a message is delivered to the service platform. The translation table may be on board the consumer device, or accessed on the network. In a third scenario nearly identical to the second scenario, the LUT at headset 840 outputs the appropriate signal as a DTMF signal rather than as an ADSI signal. In a fourth scenario, instead of a subscriber speaking a command into microphone 841, the network 800 generates a voice prompt in speaker 842 and, in response, the subscriber depresses button 852 to generate an output back to the network 800. This output may be in any of various formats including a voice response, text, ADSI, DTMF or other type of signal based on the profile.

Examples of call flows for a mobile network 800 where a signal originating at a service platform 802 is transmitted by the network 800, is translated at some point from text to speech, and is audible at headset 840 or at handset 822 (with text) if there is no headset 840 connected, are depicted in FIGS. 11A-11D. In the call flow of FIG. 11A, at step 900 service platform 802 has a message for a subscriber. Network 800 issues a signal to the MTSO platform 821 for forwarding to the subscriber to determine if the subscriber is available. The signal is forwarded from MTSO platform 821 to handset 822 (step 902), and is in turn transmitted from handset 822 to headset 840 over the Bluetooth link 839 to determine whether the subscriber is available (step 904). If the subscriber acknowledges that he or she is available by causing an ACK signal to be sent from headset 840 to handset 822 and includes a profile of the capabilities of headset 840 (step 906) (as in a Bluetooth-enabled headset), handset 822 sends an ACK signal to MTSO 821 (step 908) and a "request message" command is transmitted from MTSO 821 to service platform 802 (step 910) to request whatever message service platform 802 has to convey to the subscriber. The message sent over network 15 is then translated by speech processing unit 200 and is formed into a payload. The payload is then sent by the service platform 802 (step 912) to MTSO 821 which arranges for speech processing unit 200 to translate a portion of the payload into text for display on handset 822 according to the capabilities of the handset (e.g., text may be abbreviated for a limited size handset display). MTSO 821 then transmits the text message to handset 822 (step 914). TTS engine 819 at handset 822 translates the text message to audio and relays the audio message from handset 822 to headset 840 where it is played to the subscriber (step 916). The illustrated message played to the subscriber may, for example, he "Call from 732-123-4567".

Another possible call flow is shown in FIG. 11B. In this instance, at step 920 service platform 802 has a message for a subscriber. Network 800 issues a signal to the MTSO platform 821 for forwarding to the subscriber to determine if the subscriber is available. The signal is forwarded from MTSO platform 821 to handset 822 (step 922), and is in turn transmitted from handset 822 to headset 840 over the Bluetooth link 839 to determine whether the subscriber is available (step 924). If the subscriber acknowledges that he is available by sending an ACK signal to handset 822 and includes a profile of the capabilities of headset 840 (step 926), handset 822 sends an ACK signal to MTSO 821 (step 928) and a "request message" command is transmitted from MTSO 821 to service platform 802 (step 930). The message payload is then sent by the service platform 802 (step 932) to MTSO 821. In this call flow, there is no translator at MTSO 821 to convert the message payload so the payload is forwarded without translation to handset 822 (step 934). The message payload is translated to text at handset at 820 (step 936), and the text is transmitted to headset 840 where a TTS engine 857 converts the text to speech that is played at headset 840 (step 938).

In a third call flow shown in FIG. 11C, at step 940 service platform 802 has a message for a subscriber. Network 800 issues a signal to the MTSO 821 for forwarding to the subscriber to determine if the subscriber is available. MTSO 821 transmits the signal to the subscriber's handset 822 (step 942). The handset 822 responds to MTSO 821 with a profile of the handset's capabilities and identifies the on-board TTS engine 819 (step 944), and a "request message" command is transmitted from MTSO 821 to service platform 802 (step 946). The message payload is then sent by the service platform 802 (step 948) to MTSO 821. MTSO 821 translates the message payload to a text message and transmits the text message to handset 822 possibly in a compressed format (step 950). TTS engine 819 at handset 822 translates or reconnects the text message to audio and plays the decompressed message (step 952).

In a fourth call flow shown in FIG. 11D, at step 960 service platform 802 has a message for a subscriber. Network 800 issues a signal to the MTSO 821 for forwarding to the subscriber to determine if the subscriber is available (step 960). MTSO 821 transmits the signal to the subscriber's handset 822 (step 962). The handset 822 responds to MTSO 821 with a profile of the handset's capabilities, which in this case does not include a TTS engine (step 964), and a "request message" command is transmitted from MTSO 821 to service platform 802 (step 966). The message payload is then sent by the service platform 802 (step 968) to MTSO 821. Because in the example of FIG. 11D there is no TTS engine at handset 822, MTSO 821, which in this case has its own TTS engine, translates the message payload to an audio message for playback at handset 840 and transmits the audio message as a payload to handset 822 (step 970).

Figure 12:
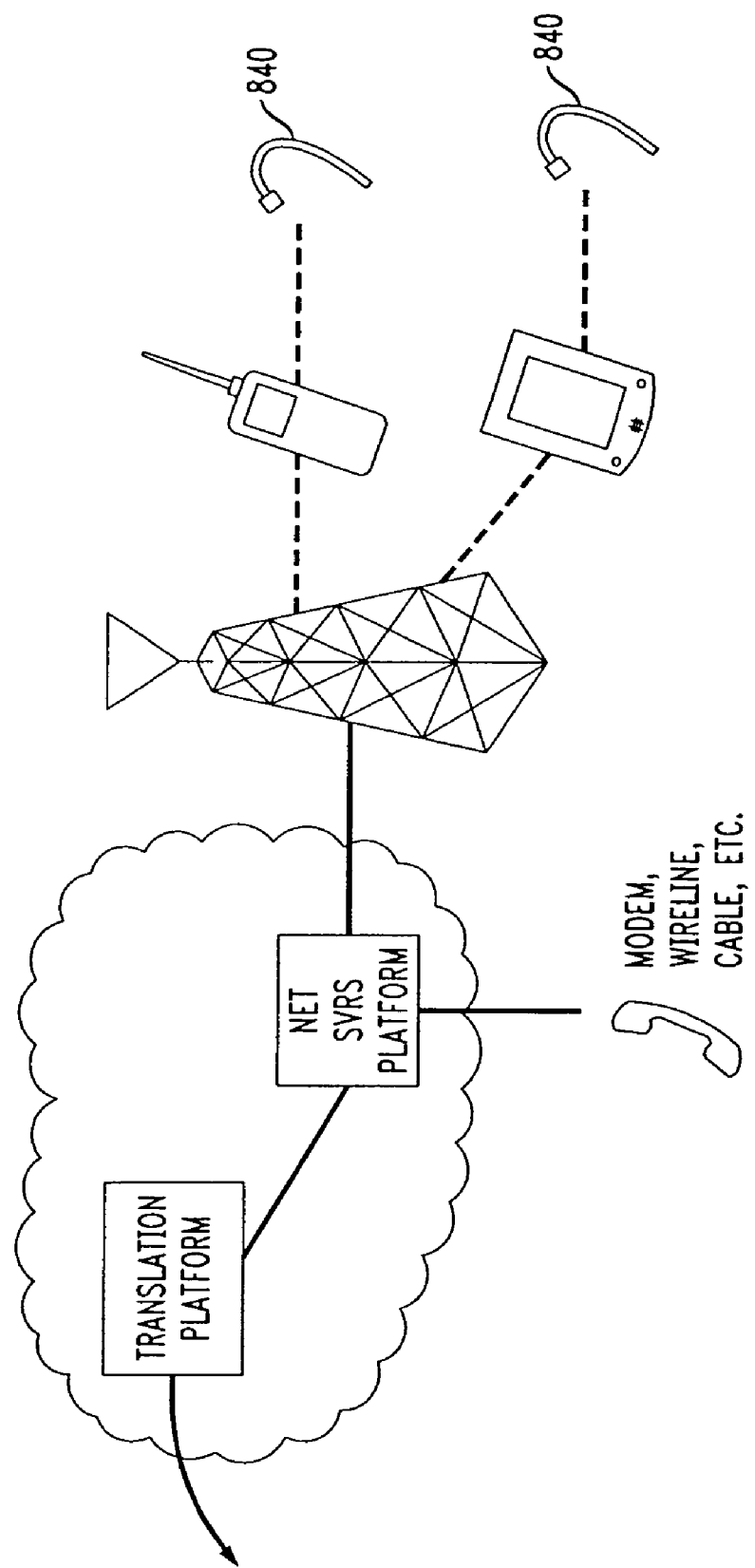
FIG. 12 is a flow chart of another call flow in which the service platform and the speech processing unit maintain an "open channel" to listen for messages passing between them.

In a fifth call flow, shown in FIG. 12, an "open channel" connection from service platform 802 to speech processing unit 200 "listens" for messages, including but not limited to (i) signaling messages for translatable features, services and applications, (ii) speech messages that comprise grammar associated with nodes on a call flow or key words used to activate features, and (iii) messages containing translated instructions, commands, etc. that originate at mobile terminals 820 or earbud 840.

Figure 13:
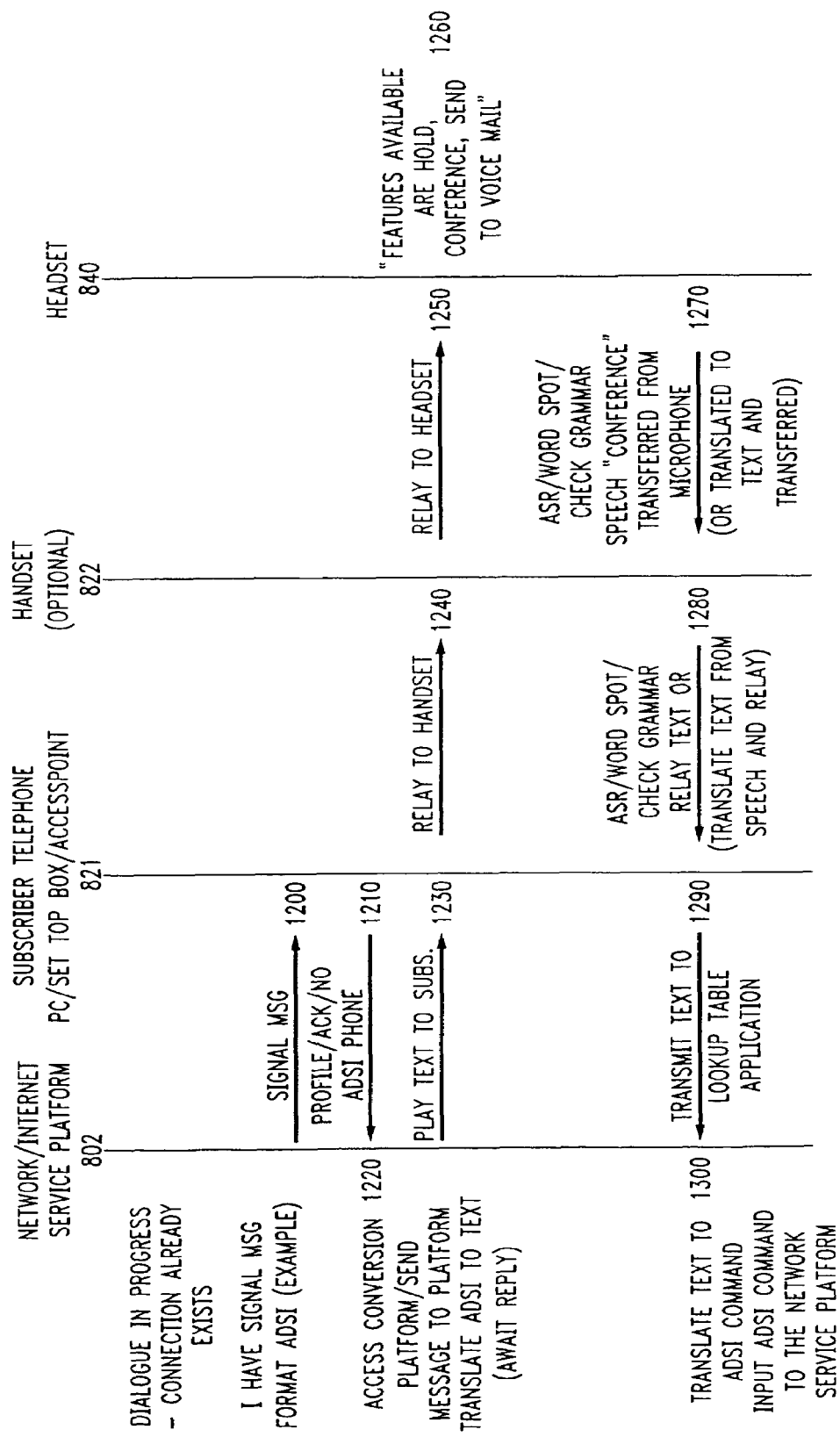
FIG. 13 is a call flow diagram of an algorithm for network transmission of signal comprising a message that is translated from text-to-speech at the service platform.

FIG. 13 illustrates an example of a call flow for a text-to-speech conversion (i.e. translation) of text originating at service platform 802 to speech which can be heard by the subscriber at headset 840 where a dialogue is already in progress. At step 1200, a signal message is sent to a subscriber device 821' such as a telephone, PC, set top box, or an Access Point as described below, that an ADSI message is to be sent. The subscriber device 821' responds with an acknowledgement of the signal and a profile of itself, which reveals that it is not an ADSI phone (step 1210). The text-to-speech conversion engine accessed by the service platform 802 is accessed and the text message is sent there for conversion from ADSI format to speech (step 1220). The converted speech is received back at service platform 802 and is sent to the subscriber via subscriber device 821' (step 1230), which then relays it to an optional handset 822 (step 1240), and in turn to headset 840 (step 1210) (or directly to headset 840 from subscriber device 821' where there is no interposed handset 822 as at a PC interface or a residential gateway). The speech may take the form of a menu of available features, such as the spoken message: "Features available are Hold, Conference, Send to Voice Mail". In response, the subscriber issues a command, such as the "Conference" command (step 1260), and an automatic speech recognition function is performed at headset 840 where a system state database 210 is used to recognize the command and convert the command to text (step 1270). The converted text is then relayed to subscriber device 821' (step 1280). Alternatively, instead of performing step 1270 at headset 840, the functions of step 1270 may be performed at handset 822. The text is transmitted from subscriber device 821' to service platform 802 (step 1290) where the text is inserted into a lookup table application and translated to an ADSI command for recognition by service platform 802 (step 1300). The speech recognition function can be performed through an open voice path between the microphone 828 and the speech processing unit (translation platform) 200.

Figure 14:
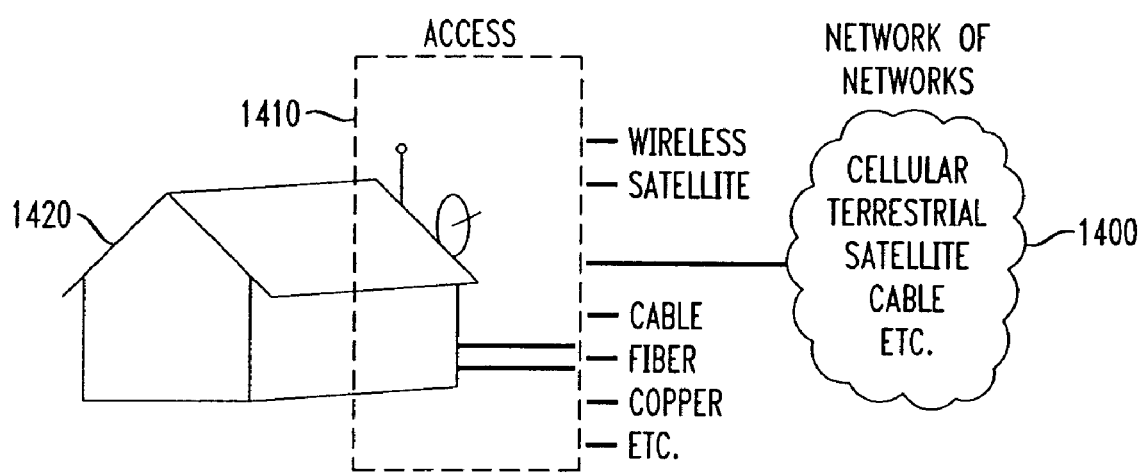
FIG. 14 depicts various types of available networks that may be connected to a particular access point.

While the above description describes examples of the implementation of the invention over wired and cellular networks, the invention is more broadly applicable to all types of networks, including in addition satellite and cable networks 1400, as depicted in FIG. 14 which also shows an access point 1410 into a location 1420 such as a home or office, for communications delivered in various ways, including by coaxial cable, fiber optics, copper wires, wireless, satellite, or microwave service, for any of the various types of networks. The access point 1410 may itself be any access point such as a residential gateway, a "bump" or "hole" in the wall, like a wireless LANport, (like Airport, Wave LAN, Orinoco, etc.) that provides a link to access for wireless or wired devices for voice, data, etc. within a home, office, or other site using a wireless protocol such as 3G (Third Generation Wireless Format), UMTS (Universal Mobile Telecommunications System), Bluetooth, etc.

It should be understood that an automatic speech recognition method and system having a system state database in accordance with the present invention may be used for communicating with a communication system in other system states presented by other types of features, such for example as call blocking features wherein the subscriber can provide instructions to the network defining the times during which calls should be blocked or specific numbers that should be blocked. A voice menu having appropriate grammar choices can be deployed to allow a subscriber to provide such instructions. Although numbers may be easily input with a key input such as a numeric keypad, other aspects of provisioning the service features are thereby simplified using speech. Speech recognition can also be used to identify ambiguous utterances. For example, rather than only accepting utterances, the system may also permit entry of key input entries: "Press or say 1 for Hold, 2 for Conference, 3 for send to Voice mail". Moreover, speech processing unit 200 may be directly connected to the service platform or may be resident elsewhere while coupled to the network. For example, all or a portion of the speech processing unit may be alternatively located at one of the Internet, a computer, a mobile phone, a headset, a handset, a base station, a set-top box, a personal digital assistant, an appliance, and a remote control.

It should be further understood that the inventive automatic speech recognition method and system that recognizes spoken utterances may be implemented as an option that can be selectively toggled on and off. For example, the default condition may be to leave the system on. In addition, the system can permit the user to request a mnemonic device during a call. Connections to the system can be by subscription by access through a service platform or by other means.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A method for permitting a subscriber to perform an action available on a communications network using a spoken utterance, comprising:

maintaining a system state database comprising a tree structure having a plurality of nodes, each respective node of said plurality of nodes representing a particular system state of a plurality of possible system states, each state comprising a plurality of possible steps in a call flow, including an always connected state in which a feature may be accessed even when a call is not in progress and being associated with a predetermined node-specific, speech-based grammar for the respective node;

awaiting from the subscriber a spoken utterance at the particular system state;

recognizing the spoken utterance by comparing the spoken utterance to the predetermined grammar for the respective node for correspondence to the particular system state; and performing an action at the network represented by the spoken utterance when the spoken utterance has been recognized as the predetermined grammar for the respective node, wherein the action activates a control sequence at the network for accessing a feature available on the network, including always-on connected features.

2. The method of claim 1, further comprising, after recognizing the spoken utterance, converting the spoken utterance to electronically-readable data having a format recognizable by one of the network, and transmitting the converted data to the respective one of the network.

3. The method of claim 1, wherein the spoken utterance comprises a command to access one of a plurality of available features on the network and a spoken menu of the available features.

4. The method of claim 3, wherein the feature comprises one of a group consisting of call forwarding, hold, conferencing, voice-mail, call back, caller-ID, caller-ID related features and caller-ID related functions.

5. The method of claim 1, wherein the node-specific grammar associated with each respective node comprises at least one of a group consisting of a word descriptive of the action to be performed, a synonym of the word, and a globally-available word available at all of said plural nodes.

6. The method of claim 1, wherein the predetermined grammar for the particular node comprises grammar for multiple languages.

7. The method of claim 6, wherein the spoken utterance of the subscriber is in one of the multiple languages, and the method further comprises the steps of:

determining the one of the multiple languages of the spoken utterance of the subscriber; and communicating via the network with the subscriber via a text-to-speech translator that translates in the determined one language of the subscriber.

8. The method of claim 1, further comprising determining a particular template to use for speech recognition from a plurality of predefined voice pattern templates, wherein the particular template comprises a subset of the predetermined grammar for the respective node, and wherein the step of recognizing the spoken utterance comprises comparing the spoken utterance to the predetermine subset of the predetermined grammar for the respective node.

9. The method of claim 8, wherein the plurality of predefined voice pattern templates comprises independent templates for males, females, and children.

10. The method of claim 1, further comprising the step of prompting the subscriber to issue the spoken utterance using one of a group consisting of a spoken menu generated by a text to speech translator, a recorded announcement of a menu, and a synthesized announcement of the menu.

11. The method of claim 1, further comprising the steps of: transmitting, by the network, a signal to the subscriber in a data format not audibly recognizable by the subscriber; and converting the transmitted signal to an audible message recognizable to the subscriber using one of a text to speech translator, a recording of speech, and a speech synthesizer.

12. The method of claim 11, wherein the signal transmitted by the network to the subscriber comprises one of the group consisting of an ADSI signal and a DTMF signal.

13. The method of claim 1, wherein the action performed comprises transmitting, by the network, of a signal to a second network.

14. The method of claim 1, wherein the method is performed by a speech recognition system, and the method further comprises the step of providing to the subscriber an ability to operatively toggle on and off the speech recognition system.

15. The method of claim 1, wherein the system state database is located on a speech processing unit coupled to the network through one of the group consisting a local communications office equipment, the Internet, a computer, a mobile phone, a headset, a handset, a base station, a set-top box, a personal digital assistant, an appliance, and a remote control, and wherein said step of comparing the spoken utterance is performed at the location of the system state database.

16. The method of claim 1, further comprising: inputting a key input, and wherein the step of performing the action comprises performing the action in accordance with the spoken utterance and the key input.

17. A communications system for permitting a subscriber to perform an action available on a communications network using a spoken utterance comprising:
  a device coupled to the network and into which an utterance may be spoken by a user,
  a system state database accessible to the network and defining a tree structure having a plurality of nodes, each respective node of said plural nodes representing a particular system state of a plurality of possible system states, each state comprising a plurality of possible steps in a call flow, including an always connected state in which a feature may be accessed even when a call is not in progress and being associated with a predetermined node-specific, speech-based grammar for the respective node;
  means for interpreting the user-spoken utterance;
  means for comparing the interpreted spoken utterance to the predetermined grammar for the respective node corresponding to the particular system state to recognize the spoken utterance as corresponding to the predetermined grammar associated with the respective node; and
  means for performing an action represented by the spoken utterance at the network when the spoken utterance has been recognized as corresponding to the predetermined grammar associated with the respective node, wherein the action activates a control sequence at the network for accessing a feature available on the network, including always-on connected features.

18. The communications system of claim 17, wherein the spoken utterance comprises one of a group consisting of a command to access a feature available at the network, and a spoken menu of available features at the network.

19. The communications system of claim 17, wherein the spoken utterance comprises a command to access a feature available at the network, the feature comprising one of a group consisting of call forwarding, hold, conferencing, voice-mail, call back, and caller-ID.

20. The communications system of claim 17, wherein said interpreting means comprises an utterance verification engine.

21. The communication system of claim 17, wherein said comparing means comprises a reference database which comprises the predetermined node-specific grammar associated with each respective node.

22. The communications system of claim 21, wherein the system state and reference databases are both maintained on a speech processing unit coupled to the network through one of a group consisting of a local communications office equipment, the Internet, a computer, a mobile phone, a headset, a handset, a base station, a set-top box, a personal digital assistant, an appliance, and a remote control.

23. The communications system of claim 21, wherein the node-specific grammar associated with each respective node comprises at least one of a group consisting of a word that is descriptive of the action to be performed, a synonym of said at least one word, and a globally-available word available at all of said plural nodes.

24. The communications system of claim 17, wherein the predetermined grammar for the particular node comprises grammar for multiple languages.

25. The communications system of claim 24, further comprising means for determining the language of the spoken utterance of the user, and a text-to-speech translator for translating communications from a network to the user in the determined language of the user.

26. The communications system of claim 17, further comprising means for offering the user a spoken menu of the predetermined grammar available at the respective node in the call flow.

27. The communications system of claim 26, further comprising means for receiving the requested spoken menu and at least a partial text menu of the available features.

28. The communications system of claim 17, further comprising means for transmitting, to the user, a signal in a data format not audibly recognizable by the user, a text to speech translator, and means for converting the transmitted signal to an audible message recognizable to the user using the text to speech translator.

29. The communications system of claim 28, wherein the transmitted signal comprises one of a group consisting of an ADSI signal and a DTMF signal.

30. The communications system of claim 17, wherein the means for performing an action comprises means for transmitting a signal transmitted between networks.

31. The communications system of claim 17, further comprising means for toggling on and off the speech recognition and text-to-speech functionality.

32. The communications system of claim 17, further comprising:
  means for inputting a key input, and wherein the means for performing the action comprises performing the action in accordance with the spoken utterance and the key input.

* * * * *